United States Patent
He et al.

(10) Patent No.: US 8,032,598 B1
(45) Date of Patent: *Oct. 4, 2011

(54) METHODS AND SYSTEMS OF ELECTRONIC MESSAGE THREADING AND RANKING

(75) Inventors: Yongqiang He, Fremont, CA (US); Mohan Kumar, San Jose, CA (US); Venkat Rangan, San Jose, CA (US)

(73) Assignee: Clearwell Systems, Inc., Mountain View, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 11/657,398

(22) Filed: Jan. 23, 2007

Related U.S. Application Data

(63) Continuation of application No. 11/457,317, filed on Jul. 13, 2006, now Pat. No. 7,593,995.

(60) Provisional application No. 60/761,501, filed on Jan. 23, 2006, provisional application No. 60/761,679, filed on Jan. 23, 2006, provisional application No. 60/761,500, filed on Jan. 23, 2006.

(51) Int. Cl.
*G06F 15/16* (2006.01)
(52) U.S. Cl. .................... 709/206; 709/205
(58) Field of Classification Search .................. 709/206
See application file for complete search history.

(56) References Cited

U.S. PATENT DOCUMENTS

| | | | |
|---|---|---|---|
| 6,275,820 B1 | 8/2001 | Navin-Chandra et al. | |
| 6,385,602 B1 | 5/2002 | Tso et al. | |
| 6,493,663 B1 | 12/2002 | Ueda | |
| 6,760,694 B2 | 7/2004 | Al-Kazily et al. | |
| 6,873,958 B2 | 3/2005 | Artinger | |
| 6,993,535 B2 | 1/2006 | Bolle et al. | |
| 7,007,067 B1 | 2/2006 | Azvine et al. | |
| 7,185,000 B1 | 2/2007 | Brown et al. | |
| 7,219,130 B2 * | 5/2007 | Kumar et al. | 709/206 |
| 7,421,690 B2 * | 9/2008 | Forstall et al. | 718/100 |
| 7,539,725 B2 | 5/2009 | Nutkis | |
| 7,546,348 B2 | 6/2009 | Wilson et al. | |
| 7,593,995 B1 | 9/2009 | He et al. | |
| 7,599,831 B2 | 10/2009 | Ford | |
| 7,627,590 B2 | 12/2009 | Boguraev et al. | |
| 7,685,106 B2 | 3/2010 | Brooks et al. | |

(Continued)

OTHER PUBLICATIONS

Bernard Kerr, Thread Arcs: An Email Thread Visulization, Collaborative User Experience Group IBM Research, 2003.

(Continued)

*Primary Examiner* — Peter-Anthony Pappas
*Assistant Examiner* — Ninos Donabed
(74) *Attorney, Agent, or Firm* — Kilpatrick Townsend & Stockton LLP

(57) ABSTRACT

A system of ranking e-mail threads is disclosed. The system receives e-mail messages, and determines e-mail threads in response to the e-mail messages. The system determines an e-mail rank associated with each e-mail message in the e-mail threads, where an e-mail rank associated with an e-mail message is determined in response to a sender identifier related to the e-mail message. The system also determines a thread rank for each e-mail thread, where a thread rank associated with an e-mail thread is determined in response to e-mail ranks of each e-mail message associated with each respective e-mail thread. The system then determines an ordering of the e-mail threads based on the thread rank associated with each e-mail thread.

22 Claims, 15 Drawing Sheets

U.S. PATENT DOCUMENTS

| | | | |
|---|---|---|---|
| 7,698,346 B2 * | 4/2010 | Henderson | 707/781 |
| 7,730,081 B2 | 6/2010 | Bromm et al. | |
| 7,743,051 B1 | 6/2010 | Kashyap et al. | |
| 7,761,524 B2 | 7/2010 | Carmel et al. | |
| 7,765,212 B2 | 7/2010 | Surendran et al. | |
| 2002/0055936 A1 | 5/2002 | Cheng et al. | |
| 2002/0078158 A1 | 6/2002 | Brown et al. | |
| 2003/0023435 A1 | 1/2003 | Josephson | |
| 2003/0028580 A1 | 2/2003 | Kucherawy | |
| 2003/0101182 A1 | 5/2003 | Govrin et al. | |
| 2003/0110162 A1 | 6/2003 | Newman | |
| 2003/0167402 A1 | 9/2003 | Stolfo et al. | |
| 2003/0195937 A1 * | 10/2003 | Kircher et al. | 709/207 |
| 2003/0220922 A1 | 11/2003 | Yamamoto et al. | |
| 2004/0128276 A1 | 7/2004 | Scanlon et al. | |
| 2004/0133564 A1 | 7/2004 | Gross et al. | |
| 2004/0143569 A1 | 7/2004 | Gross et al. | |
| 2004/0148280 A1 * | 7/2004 | Chimura | 707/3 |
| 2004/0220925 A1 | 11/2004 | Liu et al. | |
| 2004/0221295 A1 | 11/2004 | Kawai et al. | |
| 2004/0249709 A1 * | 12/2004 | Donovan et al. | 705/14 |
| 2004/0260534 A1 | 12/2004 | Pak et al. | |
| 2005/0055359 A1 * | 3/2005 | Kawai et al. | 707/100 |
| 2005/0097321 A1 | 5/2005 | Zhu et al. | |
| 2005/0144245 A1 | 6/2005 | Lowe | |
| 2005/0154580 A1 | 7/2005 | Horowitz et al. | |
| 2005/0198175 A1 * | 9/2005 | Thomas et al. | 709/206 |
| 2005/0223061 A1 * | 10/2005 | Auerbach et al. | 709/206 |
| 2005/0228774 A1 | 10/2005 | Ronnewinkel | |
| 2006/0010217 A1 * | 1/2006 | Sood | 709/206 |
| 2006/0031373 A1 * | 2/2006 | Werner et al. | 709/207 |
| 2006/0083357 A1 * | 4/2006 | Howell et al. | 379/88.04 |
| 2006/0083358 A1 * | 4/2006 | Fong et al. | 379/88.13 |
| 2006/0242243 A1 * | 10/2006 | Matsumoto | 709/206 |
| 2006/0248151 A1 | 11/2006 | Belakovskiy et al. | |
| 2007/0083598 A1 * | 4/2007 | Kawakami et al. | 709/206 |
| 2007/0106729 A1 | 5/2007 | Adams et al. | |
| 2007/0157287 A1 * | 7/2007 | Lim | 726/1 |

OTHER PUBLICATIONS

Maryam Samiei, EzMail: Using Information Visualization Techniques to Help Manage Email, School of Engineering Science Simon Fraser University, 2004.

Stephen Wan, Generating Overview Summeries of Ongoing Email Discussions, Department of Computing Macquarine University, 2004.

Yejun Wu, Indexing emails and email threads for retrieval, College on Information Studies and UMIACS University of Maryland, 2005.

* cited by examiner

METHODS AND SYSTEMS OF ELECTRONIC MESSAGE THREADING AND RANKING

CROSS-REFERENCES TO RELATED APPLICATIONS

This application is a continuation of U.S. patent application Ser. No. 11/457,317, filed Jul. 13, 2006 and entitled "Methods and Systems of Electronic Message Threading and Ranking," which claims the benefit of U.S. Provisional Application No. 60/761,500, filed Jan. 23, 2006 and entitled "E-Mail Threading, Ranking, Derivation and Topic Classification Methods and Apparatus," the disclosures of which are hereby incorporated by reference for all purposes; and this application claims the benefit of U.S. Provisional Application No. 60/761,501, filed Jan. 23, 2006 and entitled "Incremental E-Mail Crawling and Indexing Methods and Apparatus" and U.S. Provisional Application No. 60/761,679, filed Jan. 23, 2006 and entitled "System, Method, and User Interface for Distributed E-Mail Analysis," the disclosures of which are hereby incorporated by reference for all purposes.

BACKGROUND OF THE INVENTION

Embodiments of the present invention generally relate to techniques for processing electronic messages. More particularly, the present inventions relates to methods and systems of electronic message threading and ranking.

Collaboration using electronic messaging, such as e-mail and instant messaging, is becoming increasingly ubiquitous. Many users and organizations have transitioned to "paperless" offices, where information and documents are communicated almost exclusively using electronic messaging. As a result, users and organizations are also now expended time and money to sort and archive increasing volumes digital documents and data.

At the same time, state and federal regulators such as the Federal Energy Regulatory Commission (FERC), the Securities and Exchange Commission (SEC), and the Food and Drug Administration (FDA) have become increasingly aggressive in enforcing regulations requiring storage, analysis, and reporting of information based on electronic messages. Additionally, criminal cases and civil litigation frequently employ electronic discovery techniques, in addition to traditional discovery methods, to discover information from electronic documents and messages.

One problem is that complying with these disclosure and/or reporting requirements is difficult because of the large amounts of electronic messages that accumulate. As broadband connections to the Internet are common in most homes and business, e-mails frequently include one or more multi-Megabyte attachments. Moreover, these e-mails and attachments are increasingly of diverse and propriety formats, making later access to data difficult without the required software.

Another problem is that the disclosure and/or reporting requirements do not simply require that the electronic message be preserved and then disclosed. Often, the disclosure and/or reporting requirements are more directed toward information about the electronic message, such as who had access to sensitive data referred to in the contents of a particular electronic message. Some companies have teams of employees spending days and weeks reviewing e-mails in order to respond to regulatory audits and investigations. For these reasons, the inventors believe that users and organizations need electronic message analysis solutions to help lower costs in disclosing and/or reporting information related to electronic messaging.

In light of the above, there is a need for techniques for processing electronic messages that address some of the problems in the prior art.

BRIEF SUMMARY OF THE INVENTION

Embodiments of the present invention generally relate to techniques for processing electronic messages. More particularly, the present inventions relates to methods and systems of electronic message threading and ranking.

In one embodiment, a system of ranking e-mail threads includes a communications interface and a processor. The communications interface receives a plurality of e-mail messages. The processor determines a plurality of e-mail threads in response to the plurality of e-mail messages. The processor determines an e-mail rank associated with each e-mail message in the plurality of e-mail threads. An e-mail rank associated with an e-mail message is determined in response to a sender identifier related to the e-mail message. The processor determines a thread rank for each e-mail thread in the plurality of e-mail threads. A thread rank associated with an e-mail thread is determined in response to e-mail ranks of each e-mail message associated with each respective e-mail thread. The processor then determines an ordering of the plurality of e-mail threads in response to the thread rank associated with each e-mail thread in the plurality of e-mail threads.

In some embodiments, the processor displays the ordering of the plurality of e-mail threads on a display. The processor may determine the e-mail rank of the e-mail message in response to a set of message attributes selected from a group consisting of: a time attribute, a recipient identifier, a number of recipients, a carbon copy recipient identifier, a blind carbon copy recipient identifier, a subject, a body, a quoted text portion, one or more attachments, and a signature block.

The processor may receive organizational data associated with the sender identifier of the e-mail message. The processor may determine an e-mail rank associated with each e-mail message in the plurality of e-mail threads in response to the organizational data. The organizational data may include a department associated with the sender identifier, group information associated with the sender identifier, a title associated with the sender identifier, security information associated with the sender identifier, and the like.

The processor may process the e-mail message to determine whether the e-mail message initiated sending of e-mail messages associated with one of the plurality of e-mail threads. The processor then determines the e-mail rank associated with the e-mail message in response to the determination. The processor may determine the e-mail rank associated with the e-mail message in response to a value associated with text contributed to the e-mail message by a sender of the e-mail message. The processor may determine the e-mail rank associated with the e-mail message in response to a value associated with a distribution list including a recipient of the e-mail message. The processor may determine the e-mail rank associated with the e-mail message in response to a value associated with an attachment included in the e-mail message.

According to one embodiment, the present invention is directed to a method of ranking e-mail thread. The method includes receiving a plurality of e-mail messages and determining a plurality of e-mail threads in response to the plurality of e-mail messages. The method includes determining an e-mail rank associated with each e-mail message in the plurality of e-mail threads, wherein an e-mail rank associated with an e-mail message is determined in response to a sender identifier related to the e-mail message. The method includes determining a thread rank for each e-mail thread in the plurality of e-mail threads, wherein a thread rank associated with an e-mail thread is determined in response to e-mail ranks of each e-mail message associated with each respective e-mail thread. An ordering of the plurality of e-mail threads is then determined in response to the thread rank associated with each e-mail thread in the plurality of e-mail threads.

According to another embodiment, a computer program product for a computer system having a processor resides on a computer readable medium. The computer program product includes code for receiving a plurality of e-mail messages and code for determining a plurality of e-mail threads in response to the plurality of e-mail messages. The computer program product includes code for determining an e-mail rank associated with each e-mail message in the plurality of e-mail threads, wherein an e-mail rank associated with an e-mail message is determined in response to a sender identifier related to the e-mail message. The computer program product includes code for determining a thread rank for each e-mail thread in the plurality of e-mail threads, wherein a thread rank associated with an e-mail thread is determined in response to e-mail ranks of each e-mail message associated with each respective e-mail thread. The computer program product includes code for determining an ordering of the plurality of e-mail threads in response to the thread rank associated with each e-mail thread in the plurality of e-mail threads.

A further understanding of the nature and the advantages of the inventions disclosed herein may be realized by reference of the remaining portions of the specification and the attached drawings.

DETAILED DESCRIPTION OF THE INVENTION

Embodiments of the present invention generally relate to techniques for processing electronic messages. More particularly, the present inventions relates to methods and systems of electronic message threading and ranking.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

Processing of Electronic Messages

Figure 1:
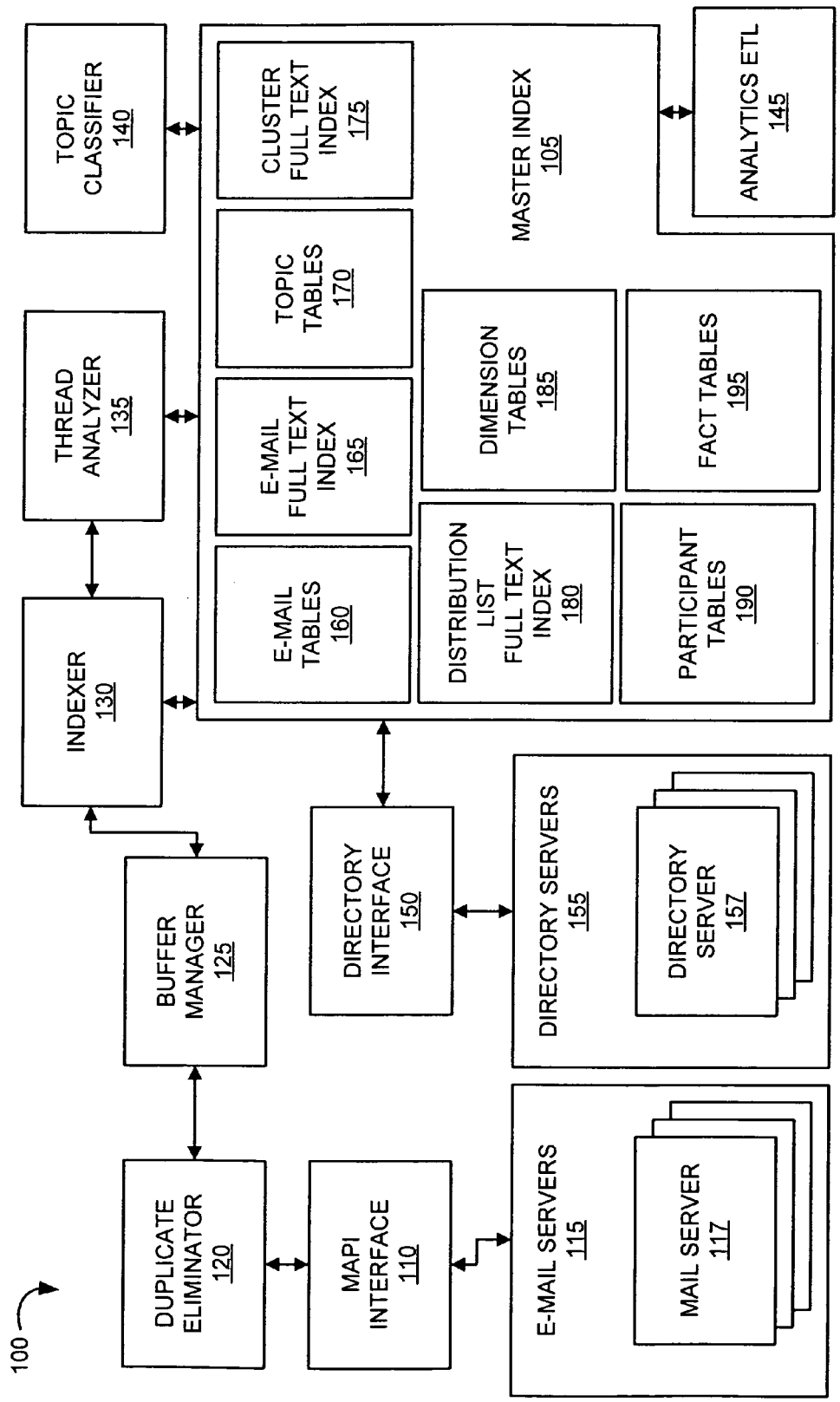
FIG. 1 is a block diagram of an electronic message processing system in an exemplary implementation of the invention.

FIG. 1 is a block diagram of an electronic message processing system 100 in an exemplary implementation of the invention. Electronic message processing system 100 includes master index 105, messaging applications programming interface (MAPI) module 110, e-mail servers 115, duplicate eliminator 120, buffer manager 125, indexer 130, thread analyzer 135, topic classifier 140, analytics extraction, transformation, and loading (ETL) module 145, directory interface 150, and directory servers 155. Master index 105 includes e-mail tables 160, e-mail full text index 165, topic tables 170, cluster full text index 175, distribution list full text index 180, dimension tables 185, participant tables 190, and fact tables 195. E-mail servers 115 include one or more mail servers 117. Directory servers 155 include one or more directory servers 157.

Master index 105 includes hardware and/or software elements that provide storage and retrieval of information associated with electronic messages, such as e-mail, instant messaging (IM) messages, Short Message Service (SMS) messages, Multimedia Message Service (MMS), and the like. Some examples of master index 105 are flat files, databases, data marts, data warehouses, and other repositories of data. Although the disclosure references electronic messages as e-mail messages, the disclosure should not be considered as limited to only e-mail message formats. The disclosure may also apply to other types of electronic messages, such as IM, SMS, MMC messages, and the like.

In various embodiments, e-mail tables 160 store information associated with e-mail messages processed by the system 100. E-mail full text index 165 stores an inverted index that enables fast searching of contents (e.g., headers and body), metadata, and attachments of e-mail messages processed by the system 100. Topic tables 170 store relationships between categories or topics and e-mail messages processed by the system 100. Cluster full text index 175 stores an index of e-mail messages that have a close relationship, such as relationships based on statistical analysis of noun phrases, and the like. The e-mail messages having close relationships are then associated with topics in the topic tables 170. Distribution list full text index 180 stores the full text of e-mail messages associated with a distribution or mailing list. Participant tables 190 store information related to participants of a distribution or mailing list (e.g., To-recipients, CC-recipients, BCC-recipients, etc.). Dimension tables 185 and fact tables 195 store information related to data warehouse processing of e-mail messages.

MAPI module 110 is linked to the e-mail servers 115 and to the duplicate eliminator 120. In this example, the e-mail servers 115 include one or more mail servers 117. MAPI module 110 includes hardware and/or software elements that communicate with the e-mail servers 115. E-mail servers 115 include hardware and/or software elements that provide electronic messaging services, such as e-mail transport, storage, and retrieval. One example of the mail servers 117 is a computer system running Microsoft Exchange Server 2000 from Microsoft Corporation of Redmond, Wash. In other examples, the e-mail servers 117 may include operating systems, such as Microsoft Windows 2000/XP/2003, UNIX, and Linux, and mail transport agents, mail user agents, and the like. E-mail messages may be stored on the e-mail servers 117 in a file, such as an Outlook PST file, and the like.

Duplicate eliminator 120 includes hardware and/or software elements that detect and eliminate redundant and/or duplicative information retrieved by the MAPI module 110. Buffer manager 125 is linked to the duplicate eliminator 120 and the indexer 130. Buffer manager 125 includes hardware and/or software elements that manage data communications between the duplicate eliminator 120 and the indexer 130.

Indexer 130 is linked to the master index 105. Indexer 130 includes hardware and/or software elements that process electronic messages to determine message content and generate metadata associated with the electronic messages. For example, the index 130 may process an e-mail message to parse header and body fields to retrieve message content and generate metadata associated with the e-mail message.

Thread analyzer 135 is linked to the indexer 130 and the master index 105. Thread analyzer 135 includes hardware and/or software elements that organize e-mail messages into one or more e-mail threads. An e-mail thread is a series or sequence of one or more e-mail messages that form a logical "discussion" or "communication." Some examples of e-mail messages within an e-mail thread are e-mail messages related by sender address, recipient address, topic, and time. Another example of e-mail messages within an e-mail thread are e-mail messages with forwarding replies, CC-recipients, BCC-recipients, and the like. In this example, the thread analyzer 135 determines the position of an e-mail message in an e-mail thread in response to message content and metadata of the e-mail message.

Topic classifier 140 is linked to the master index 105. Topic classifier 140 includes hardware and/or software elements that determine one or more topics or categories in response to e-mail message content and metadata. The topic classifier 140 may determine the topic of an e-mail message based on the subject header or in response to the content of the body of and e-mail message. The topic classifier 140 may also associated an e-mail message with a given topic, classifier, and/or category.

Analytics ETL module 145 is linked to the master index 105. Analytics ETL module 145 includes hardware and/or software elements that provide an interface accessing content and metadata processes by the system 100. In one example, the analytics ETL module 145 provides an interface for extracting data from the master index 105 and/or external data sources; an interface for transforming the data, which includes cleansing, aggregation, summarization, integration, as well as basic transformation; and an interface for loading the data into some form of data warehouse for further analysis and processing.

Directory interface 150 is linked to the master index 105 and the directory servers 155. Directory interface 150 includes hardware and/or software elements that access information stored in a directory. A directory is any database of information associated with objects, such as users or computer hosts. In various embodiments, the directory servers 155 include one or more directory servers 157 running Active Directory by Microsoft Corporation of Redmond, Wash. In other embodiments, other types of directory servers and/or services may be used such as Lightweight Directory Access Protocol (LDAP) servers, Identity Management servers, and the like. In various embodiments, examples of information stored in the directory servers 155 include "organizational" or "corporate" data, such as department identifiers associated with a user or computer host, a group identifier associated with a user, a corporate or departmental title associated with a user, telephone and address information, and security information.

In operation of the electronic message processing system 100, the MAPI module 110 retrieves e-mail messages from the e-mail servers 115 (e.g., from one of the mail servers 117). For example, the system 100 may "crawl" the e-mail servers 115 requesting e-mail messages through the MAPI module 110. The duplicate eliminator 120 filters redundant and/or duplicate e-mail messages received from the e-mail servers 115.

The indexer 130 receives the e-mail messages from the duplicate eliminator 120 through the buffer manager 125. The indexer 130 processes the e-mail messages to determine the contents of the e-mail messages and metadata associated with each e-mail message. The indexer 130 stores a full text index of the e-mail messages and the metadata in the master index 105. For example, the indexer 130 stores sender and recipient information associated with an e-mail message in the e-mail tables 160; the indexer 130 stores an inverted word list of the full text of the e-mail message in the e-mail full text index 165; etc.

The thread analyzer 135 processes the contents of the e-mail messages and the metadata in the master index 105 to organize the e-mail messages into e-mail threads. In general, the thread analyzer 135 organizes the e-mail messages into e-mail threads that form a discussion or communication of a topic or concept. One example of operation of the thread analyzer 135 is described below with respect to FIGS. 9, 10A, and 10B. The topic classifier 140 processes the contents of the e-mail messages and the metadata in the master index 105 to determine topics or categories associated with the e-mail messages. The topic classifier 140 stores the categories or topics in the topics tables 170, and stores a full text index of e-mail messages belonging to and/or associated with the same topic in the cluster full text index 175.

The directory interface 150 retrieves directory or organizational information from the directory servers 155 (e.g., from one of the directory servers 157) related to the e-mail messages. The indexer 130 or the thread analyzer 135 may use the organizational information during, processing, indexing, and/or threading of the e-mail message. In this example, the organizational data is stored in the participants tables 190 and the distribution lists full text 180.

A user or computer process connects to the analytics ETL module 145 to retrieve information associated with the e-mail messages processed by the system 100. Advantageously, the electronic message processing system 100 provides a user or organization with access to e-mail messages, and other information, such as header information, message contents, message attributes, metadata, and the like, to assist in reporting requirements or gathering information for the purposes of electronic discovery. After "crawling" e-mail repositories (e.g., one of the mail servers 117) to retrieve e-mail messages, the system 100 processes and indexes the retrieved e-mail messages and stores metadata related to the processed e-mail messages in the master index 105. The system 100 allows the user or organization to search and query the processed e-mail messages and the metadata to quickly extract and process relevant information. The system 100 further provides threading and topic classification of e-mail messages to enhance the discovery and presentation of relevant information to the user or organization.

In various embodiments, after an initial crawl of a data or e-mail repository, such as the e-mail servers 115, the system 100 may incrementally process newly arriving e-mail messages on a daily bases, an hourly bases, or the like. As described above, the new e-mail messages may be incorporated into the master index 105.

Figure 2:
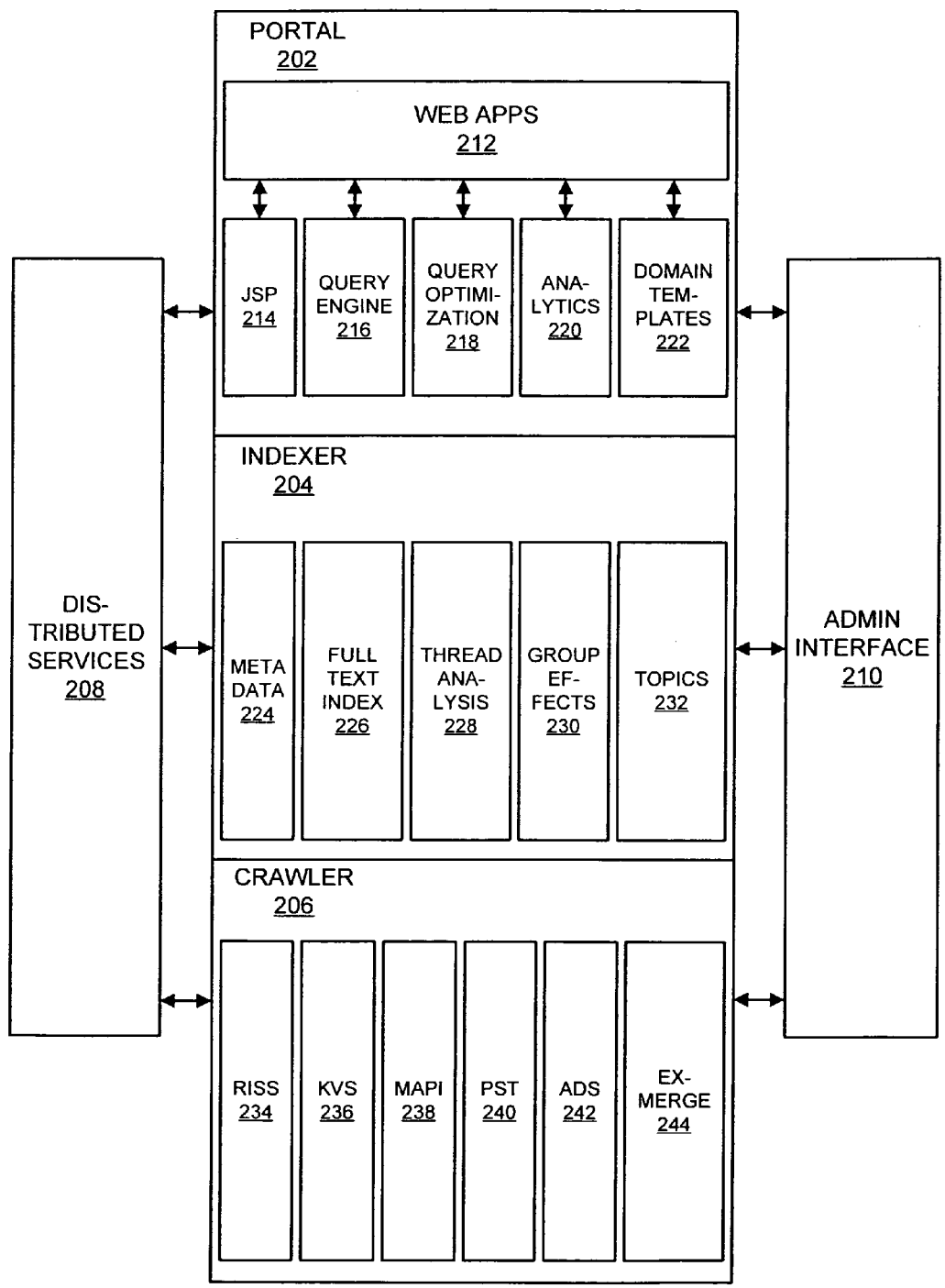
FIG. 2 is a block diagram of software components for processing electronic messages in an exemplary implementation of the invention.

FIG. 2 is a block diagram of software components 200 for processing e-mail messages in an exemplary implementation of the invention. Software components 200 include portal 202, indexer 204, crawler 206, distributed services 208, and administration interface 210. Portal 202 is linked to the indexer 204, which is linked to the crawler 206. Distributed services 208 and administration interface 210 are link to each of the portal 202, the indexer 204, and the crawler 206.

Portal 202 includes software elements for accessing and presenting information provided by the indexer 204. In this example, the portal 202 includes web applications 212 communicatively coupled to information gathering and presentation resources, such as a Java Server Page (JSP) module 214, a query engine 216, a query optimization module 218, an analytics module 220, and a domain templates module 222.

Indexer 204 includes software elements for processing and storing e-mail messages. The indexer 204 includes metadata 224, full text indices 226, thread analysis 228, group effects, 230, and topics 232.

Crawler 206 includes software elements for retrieving e-mail message from an e-mail repository. Some examples of an e-mail repository are an e-mail server (e.g., one of the mail servers 117 of FIG. 1), a Post Office Protocol (POP) enabled computer server, an Internet Message Access Protocol (IMAP) enabled computer server, and files, such as PST files, UNIX style maildirs/mbox formats, and the like. In this example, the crawler 206 includes Reference Information Storage System (RISS) module 234, KVault Software (KVS) module 236, MAPI module 238, PST module 240, Directory Services (ADS) module 242, and a Microsoft Exchange Server Mailbox Merge Wizard (ExMerge) module 244.

Figure 3:
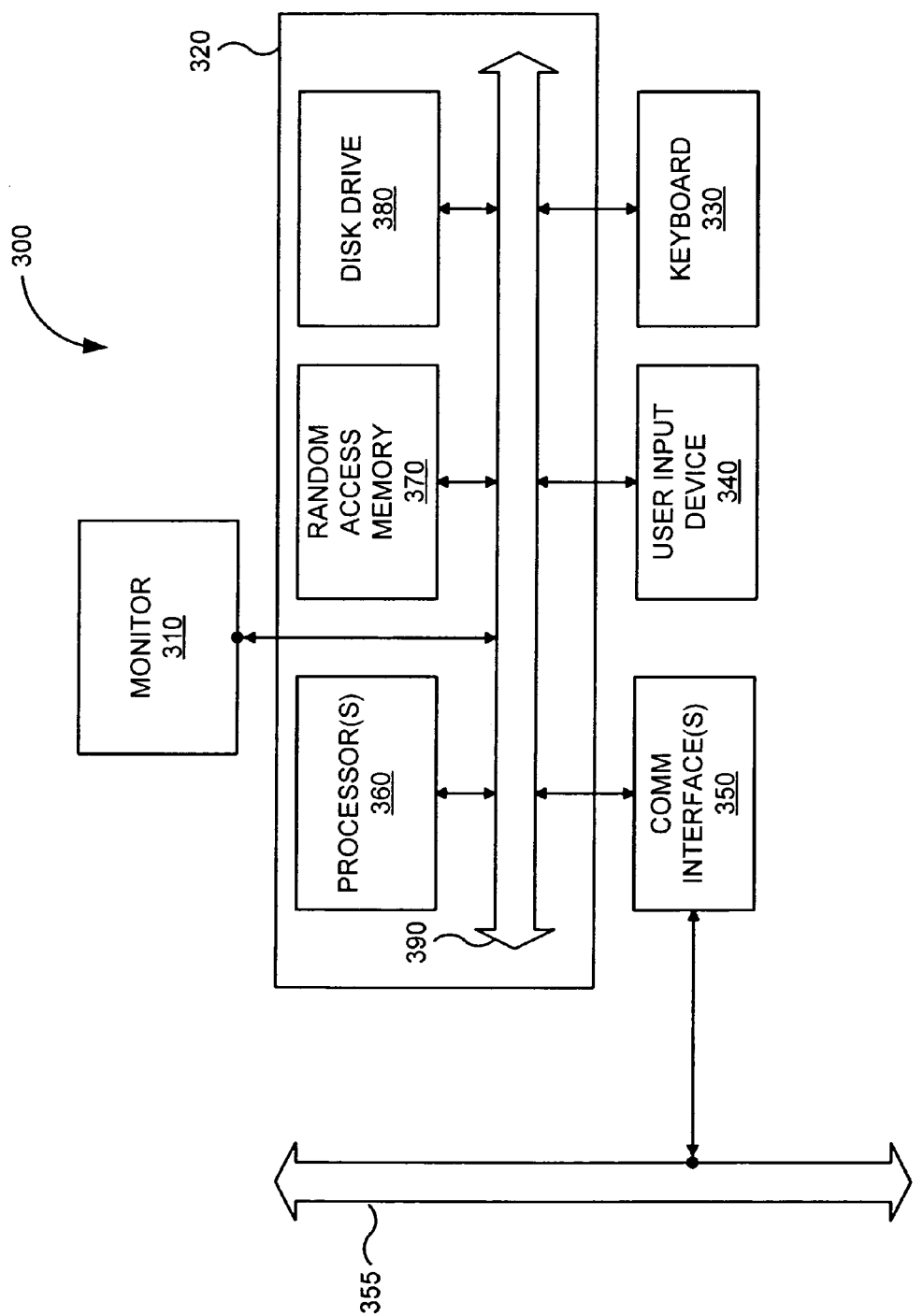
FIG. 3 is a block diagram of a computer system that may be used for processing electronic messages in an exemplary implementation of the invention.

FIG. 3 is a block diagram of a computer system 300 in an exemplary implementation of the invention. In this example, the computer system 300 includes a monitor 310, computer 320, a keyboard 330, a user input device 340, one or more computer interfaces 350, and the like. In the present embodiment, the user input device 340 is typically embodied as a computer mouse, a trackball, a track pad, a joystick, wireless remote, drawing tablet, voice command system, eye tracking system, and the like. The user input device 340 typically allows a user to select objects, icons, text and the like that appear on the monitor 310 via a command such as a click of a button or the like.

Embodiments of the computer interfaces 350 typically include an Ethernet card, a modem (telephone, satellite, cable, ISDN), (asynchronous) digital subscriber line (DSL) unit, FireWire interface, USB interface, and the like. For example, the computer interfaces 350 may be coupled to a computer network 355, to a FireWire bus, or the like. In other embodiments, the computer interfaces 350 may be physically integrated on the motherboard of the computer 320, may be a software program, such as soft DSL, or the like.

In various embodiments, the computer 320 typically includes familiar computer components such as a processor 360, and memory storage devices, such as a random access memory (RAM) 370, disk drives 380, and system bus 390 interconnecting the above components.

The RAM 370 and disk drive 380 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, the computer system 300 may also include software that enables communications over a network such as the HTTP, TCP/IP, RTP/RTSP protocols, and the like. In alternative embodiments of the present invention, other communications software and transfer protocols may also be used, for example IPX, UDP or the like.

It will be readily apparent to one of ordinary skill in the art that many other hardware and software configurations are suitable for use with the present invention. For example, the computer may be a desktop, portable, rack-mounted or tablet configuration.

Additionally, the computer may be a series of networked computers. Further, the use of other micro processors are contemplated, such as Pentium™ or Core™ microprocessors from Intel; Sempron™ or Athlon64™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. a programmable logic device or a graphics processor unit).

In operation, the computer system 300 receives electronic messages, such as e-mail messages, from electronic messaging repositories. The computer system 300 processes an e-mail message to determine message attribute data associated with the e-mail messages. Message attribute data is information related to an attribute or content of an electronic message. Some examples of message attribute data are sender e-mail address or sender identifiers, recipient identifiers, names associated with sender/recipient identifiers, attachment data, in-line text, body content, routing information, header information, and the like. The message attribute data allows the computer system 300 to provide users and organizations with access to message content, relationships between e-mail messages, topics, rankings, and the like.

Figure 4:
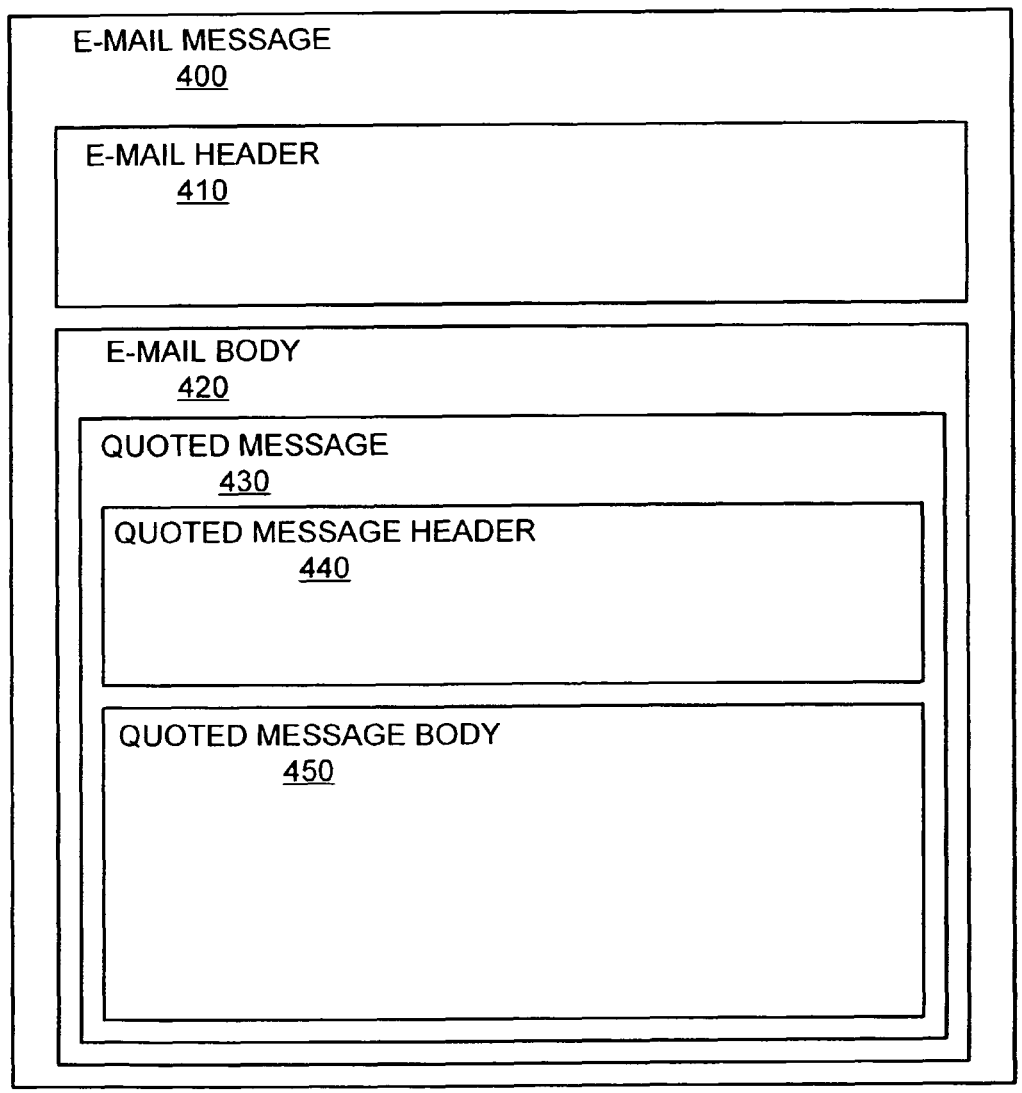
FIG. 4 is a block diagram of an exemplary e-mail message.

FIG. 4 is a block diagram of an exemplary e-mail message 400. The e-mail message 400 can be any message transmitted over a communications network, such as the Internet. In one example, the e-mail message 400 is a message communicated using one of the protocols adapted for communication using the Transport Control Protocol/Internet Protocol (TCP/IP) suite of protocols used over the Internet, such as the Simple Mail Transfer Protocol (SMTP). The e-mail message 400 may be communicated by using dedicated messaging client, such as Outlook and the like, and a web browser, such as Mozilla Firefox and Microsoft Internet Explorer and the like using a web-mail interface.

E-mail message 400 includes e-mail header 410 and e-mail body 420. In this example, e-mail header 410 generally includes message attribute data related to header information, such as routing information, spam/virus scanning information, a subject, a sender identifier (e.g., the originating or sending e-mail address), one or more recipient identifiers (e.g., To-recipients, CC-recipients, and BCC-recipients, and distribution list e-mail addresses), priority, and the like. As the e-mail message 400 travels to its destination, information about the path or network hosts through which the e-mail message 400 passed may be appended to the e-mail header 410 in the routing information.

E-mail header 410 may also contain information about the e-mail client from which the e-mail message 400 was sent. Additionally, the e-mail header 410 may include information related to the format or encoding used to communicate the e-mail body 420.

The e-mail message 400 is typically encoded in ASCII (American Standard Code for Information Interchange) text. The e-mail message 400 includes message attribute data related to portions (e.g., headers, body, etc.) of the e-mail message 400. In various embodiments, the e-mail body 420 includes non-text data, such as graphic images and sound files and the like, in-line with text and as attachments. Some examples of the contents of the e-mail body 420 are plain text, base-64 encoded text, an encoded binary file, a portion of an e-mail message, an attached Portable Document Format (PDF) file, an attached or in-line Microsoft Word document file, and the like.

In various embodiments, e-mail body 420 of the e-mail message 400 also includes a quoted message 430. The quoted message 430 itself includes quoted message header 440 and quoted message body 450. In general, quoted message 430 is a portion of an e-mail message or an entire e-mail message. Portions of e-mail messages are often included in-line with other text in the e-mail body 420. For example, the e-mail message 400 may be a reply to an initial or earlier e-mail message that is included in the e-mail body 420 as the quoted message 430. Entire or complete e-mail messages are often included in-line or as an attachment to the e-mail message 400. In other embodiments, quoted message 430 may be a forwarded messages, etc.

Quoted message header 430 comprises information, such as sender and recipient identifiers, much like the e-mail header 410. Often, the quoted message header 430 includes at least a sender identifier, one or more recipient identifiers, a subject, a timestamp, and the like. Quoted message body 450 may be plain text, html, encoded text, and the like. The quoted text body 450 also may include portions of other e-mail messages and attachments.

Figure 5:
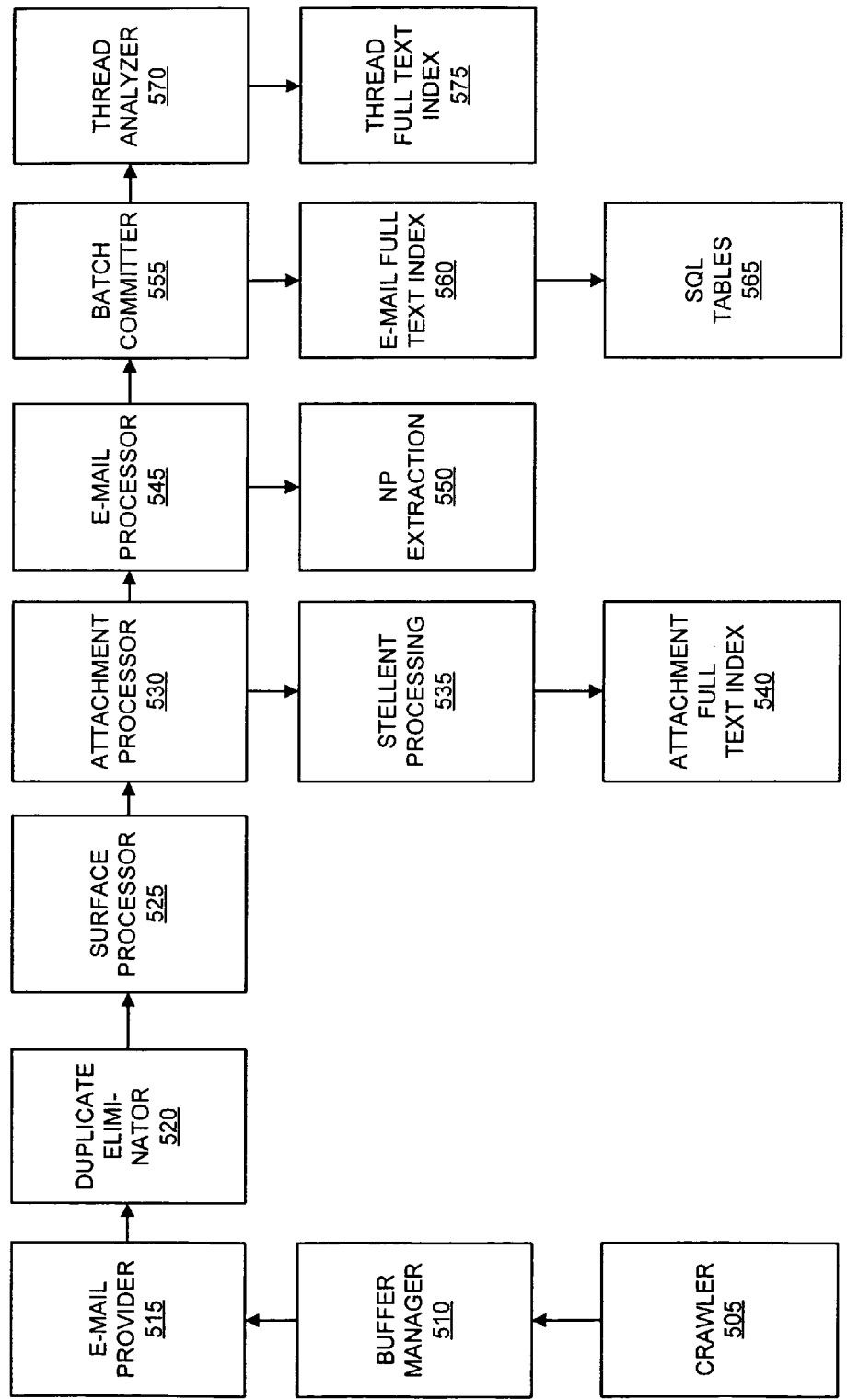
FIG. 5 is a block diagram illustrating an exemplary processing flow of e-mail messages in an exemplary implementation of the invention.

FIG. 5 is a block diagram illustrating an exemplary processing flow of electronic messages in an exemplary implementation of the invention. In crawler box 505, the computer system 300 retrieves e-mail messages from e-mail repositories, such as an e-mail server or a file containing e-mail messages, and sends the e-mail messages to a buffer manager. In buffer manager box 510, the computer system 300 buffers or otherwise manages production and consumption of the e-mail messages retrieved while the computer system 300 is "crawling" the e-mail repositories. In e-mail provider box 515, the computer system 300 creates batches of e-mail messages. In this example, batching the e-mail messages allows the computer system 300 to apply batch processing techniques to message attribute data associated with a batch of e-mail messages. For example, the computer system 300 may create batches of 10, 50, or 100 e-mail messages.

In duplicate eliminator box 520, the computer system 300 processes the e-mail messages in the e-mail message batches to determine duplicates or redundant e-mail messages. For example, a user A of the mail server 117 (FIG. 1) may have sent an e-mail message addressed to user B and to user C. When the computer system 300 retrieves e-mail messages from mailboxes on the mail server 117 for users A, B, and C, user A's mailbox contains the e-mail message as sent to user B and user C. Additionally, both user B's and user C's mailbox contains the respective user's copy of the e-mail message as received from user A. In this example, the computer system 300 receives possibly three copies of the e-mail message in the duplicate eliminator box 520.

The computer system 300 determines which of the three copies of the e-mail message to further process. In one example, the computer system 300 determines two MD5 checksums for each e-mail message to "identify" an e-mail message. A first strict MD5 checksum is computed to be unique and represents an exact match of a previously processed e-mail message. A second "relaxed" MD5 checksum is computer to be non-unique or semi-unique.

When the computer system 300 receives a new e-mail, the computer system 300 processes the new e-mail message (e.g., address normalization and cleansing) and computes a strict MD5 checksum for the new e-mail message and compares the strict MD5 checksum to previously computed strict MD5 checksums to determine whether the new e-mail message is unique. In one example of operation, the computer system 300 computes the strict MD5 checksum in response to message attribute data associated with an e-mail message using the sender e-mail address or sender identifier, sorted To-recipient e-mail addresses or To-recipient identifiers, sent time, alpha-numeric contents of subject, and the body text (e.g., body text size, contents of the body text, etc.).

The computer system 300 then computes a relaxed MD5 checksum using a portion of the message attribute data used to compute the strict MD5 checksum. Other information not included in the e-mail message but associated with the message attribute data may be used to compute the strict and relaxed MD5 checksums. Other types of integrity, detection, and authenticity algorithms, such as cyclical redundancy checks (CRCs), hashes, and the like, may be used in addition to or in the alternative to the MD5 checksum.

In this example, if the strict MD5 checksum for the new e-mail message is different, the computer system 300 computes a relaxed MD5 checksum for the new e-mail message and compares the relaxed MD5 checksum to previously computed relaxed MD5 checksums. If the relaxed MD5 checksum for the new e-mail message is different, then the new-e-mail address is not a duplicate. If the relaxed MD5 checksum for the new e-mail message is the same as one or more previously computed relaxed MD5 checksums, the computer system 300 applies rules or policies to eliminate possible duplicate e-mail messages that may occur due to time differences, header processing, and the like, and also the addition of trailing content, such as disclaimers, names of attachment files, and the like.

In surface processor box 525, the computer system 300 processes the e-mail messages (e.g., to populate the master index 105 of FIG. 1 with information related to the message attribute data). Some examples of surface processing are whether text in a body of an e-mail message is text included in another e-mail message (e.g., as a response to the e-mail message), identity information of senders, and identity information of recipients. In attachment processor box 530, the computer system 300 processes the e-mail message for attachments. If an e-mail message includes an attachment, the computer system 300 further processes the attachment in stellent processing box 535. In this example, the computer system 300 processes the attachment according to content management and searching solutions from Stellent, Inc. of Eden Prairie, Minn. In attachment full text index box 540, the computer system 300 stores an inverted index of the extracted text of an attachment, if any (e.g., in the master index 105).

In e-mail processing box 545, after attachment processing or if no attachment exists in an e-mail message, the computer system 300 operates on the batch of e-mail messages to parse or extract further information associated with message attribute data from the e-mail messages. In NP extraction box 550, for example, the computer system 300 processes subject and body content of the e-mail messages, such as to extract noun phrases, and the like. The computer system 300 then normalizes the extracted noun phrases into a feature vector that represents topical information associated with the e-mail messages.

In batch committer box 555, the computer system 300 commits the processed e-mail messages in the batch to storage. In one example, the computer system 300 populates the master index 105 with information parsed or indexed in the e-mail processor box 545. In e-mail full text index box 560 of this example, the computer system 300 stores a full text index of the e-mail messages (e.g., in the e-mail full text index 165 of FIG. 1). In SQL tables box 565, the computer system 300 prepares Structured Query Language (SQL) tables allowing the e-mail messages and message attribute data associated with the e-mail messages in the batch to be searched using SQL statements.

In thread analyzer box 570, the computer system 300 processes the e-mail messages to determine e-mail threads in response to message attribute data of the e-mail messages. In thread full text index box 575, the computer system 300 stores a full text index of e-mail threads (e.g., in the master index 105). Further operations of the computer system 300 in the thread analyzer box 570 are described further with respect to FIGS. 8A, 8B, 9, 10A, and 10B.

Figure 6:
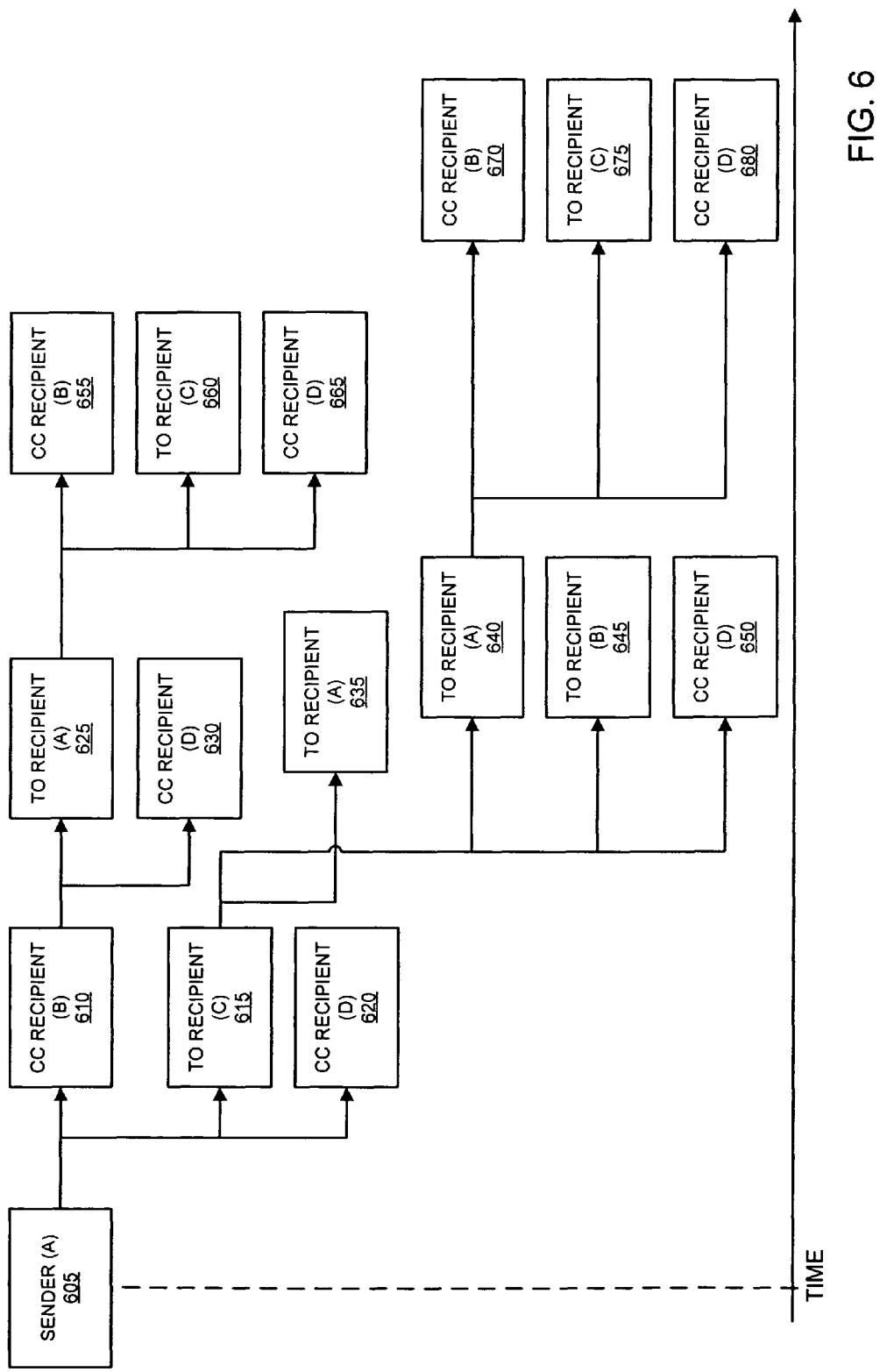
FIG. 6 is a block diagram illustrating an exemplary message sequence chart related to an e-mail thread.

FIG. 6 is a block diagram illustrating an exemplary message sequence chart related to an e-mail thread. An e-mail thread is a series or sequence of one or more e-mail messages that form a logical "discussion" or "communication." E-mail messages can be related by thread criteria, such as time, sender, topic, etc. An e-mail thread also can provide an indication of user interactions to an earlier or original e-mail message that initiated a discussion or communication formed by a series of e-mail messages. Typically, the e-mail that initiated the subsequent user interactions or communications is called a thread origin (e.g., e-mail message 605).

Referring to FIG. 6, a thread criterion defines an initial time starting at when an e-mail message 605 was sent. As a result, the e-mail thread includes e-mail messages transmitted during a time interval that satisfy another thread criterion. In this example, the computer system 300 determines e-mail messages that satisfy the thread criterion are e-mail messages related to the e-mail message 605 or otherwise transmitted in response to the e-mail message 605.

In this example, user (Sender) A composes e-mail message 605 to three users. The e-mail message 605 may be considered the origin of the e-mail thread illustrated in FIG. 6. User B receives e-mail message 610 as a carbon copy (CC) recipient. User C receives e-mail message 615 as a To-recipient. User D receives an e-mail message 620 as a CC-recipient.

In response to the e-mail message 610, the user B composes an e-message to users A and D. The user A receives e-mail message 625 as a To-recipient, and the user D receives e-mail message 630 as a CC-recipient. The user B may have forwarded or replied to the e-mail message 610 such that the e-mail messages 625 and 630 included the body text of the e-mail message 610 (in other words the original e-mail message 605). The e-mail messages 625 and 630 may also include the e-mail message 610 as an attachment, and include a similar subject as the e-mail message 610.

Next in the e-mail thread of FIG. 6, in response to the e-mail message 615, the user C composes an e-mail message to user A. The user A receives e-mail message 635 as a To-recipient. Subsequently, again in response to the e-mail message 615, the user C composes an e-mail to users A, B, and D. The user A receives e-mail message 640 as a To-recipient. The user B receives e-mail message 645 as a To-recipient. The user D receives e-mail message 650 as a CC-recipient.

After receiving the e-mail message 640, the user A composes an e-mail message to users B, C, and D in response to the e-mail message 625. The user B receives e-mail message 655 as a CC-recipient. The user C receives e-mail message 660 as a To-recipient. The user D receives e-mail message 665 as a CC-recipient.

Subsequently, in response to the e-mail message 640, the user A composes an e-mail message to users B, C, and D. The user B receives e-mail message 670 as a CC-recipient. The user C receives e-mail message 675 as a To-recipient. The user D receives e-mail message 680 as a CC-recipient.

Advantageously, the computer system 300 allows a user or organization to discover information in e-mail messages that related to discussions or communications about specific topics. The computer system 300 organizes the information, such as e-mail messages into a thread and generates one or more topics in response to message attribute data associated with e-mail messages. The computer system 300 allows the user or organization to analyze the information to drive better business performance and/or comply with regulatory requirements.

Furthermore, the computer system 300 allows the users and organizations to analyze properties of e-mail (such as recipients, replies, forwards, subject header, etc.), and combine the properties with organizational or corporate data to derive discussions and communication patterns within an organization or corporation. The computer system 300 provides access to electronic messages and message attribute data associated with the electronic messages. This allows user and organizations to quickly extract, analyze, and report information.

Derived Electronic Messages

As a result of user interactions in response to an e-mail message, subsequent e-mail messages may include quoted text from prior e-mail messages or include prior e-mail messages as attachments. The computer system 300 (FIG. 3) allows users or organizations to retrieve transactional e-mail messages from local e-mail repositories. Transactional e-mail messages are electronic messages that are received from and/or stored on an e-mail server or in a file (e.g., one of the mail servers 117 of FIG. 1). A transactional message may include quoted text or attachments.

In various embodiments, the computer system 300 processes the transactional e-mail messages to determine derived e-mail messages. Derived e-mail message are electronic message send by electronic messaging services, where the electronic messages are included within other electronic messages. As described with respect to FIG. 4, some examples of derived e-mail messages are quoted text in forwarded or replied to e-mail messages, and e-mail messages included as attachments. For example, a transactional e-mail message may include a derived e-mail message. A benefit provided by various embodiments is that the computer system 300 allows users and organizations to capture information in derived e-mail messages that otherwise may not have been retrieved from the local e-mail repositories as transactional e-mail messages.

As the use of electronic messaging proliferates, e-mails are often received from outside of organizations that initiate discussions or communications within the organization. The computer system 300 provides the users or organizations the ability to determine from derived e-mail messages whether discussions or communication originated from outside the organization. Additionally, the computer system 300 allows the users or organizations to track whether topic discussion left or went outside the organization during a series of e-mail messages and later returned to an internal discussion within the organization.

In general, a system for processing e-mail messages (e.g., the computer system 300 of FIG. 3) includes a processor and a communications interface. The communications interface receives, from an e-mail repository, a transactional e-mail message comprising message attribute data. The processor is coupled to the communications interface. As described above, the processor places the transactional e-mail message in an e-mail thread in response to the message attribute data of the transaction e-mail message. The processor then determines whether there is a derived e-mail message included in the transactional e-mail message. For example if a derived e-mail messages, such as a reply or forwarded message, is included in the transactional e-mail message, the processor determines derived message attribute data of the derived e-mail message. The processor then places the derived e-mail message in the e-mail thread in response to the derived message attribute data of the derived e-mail message.

Figure 7:
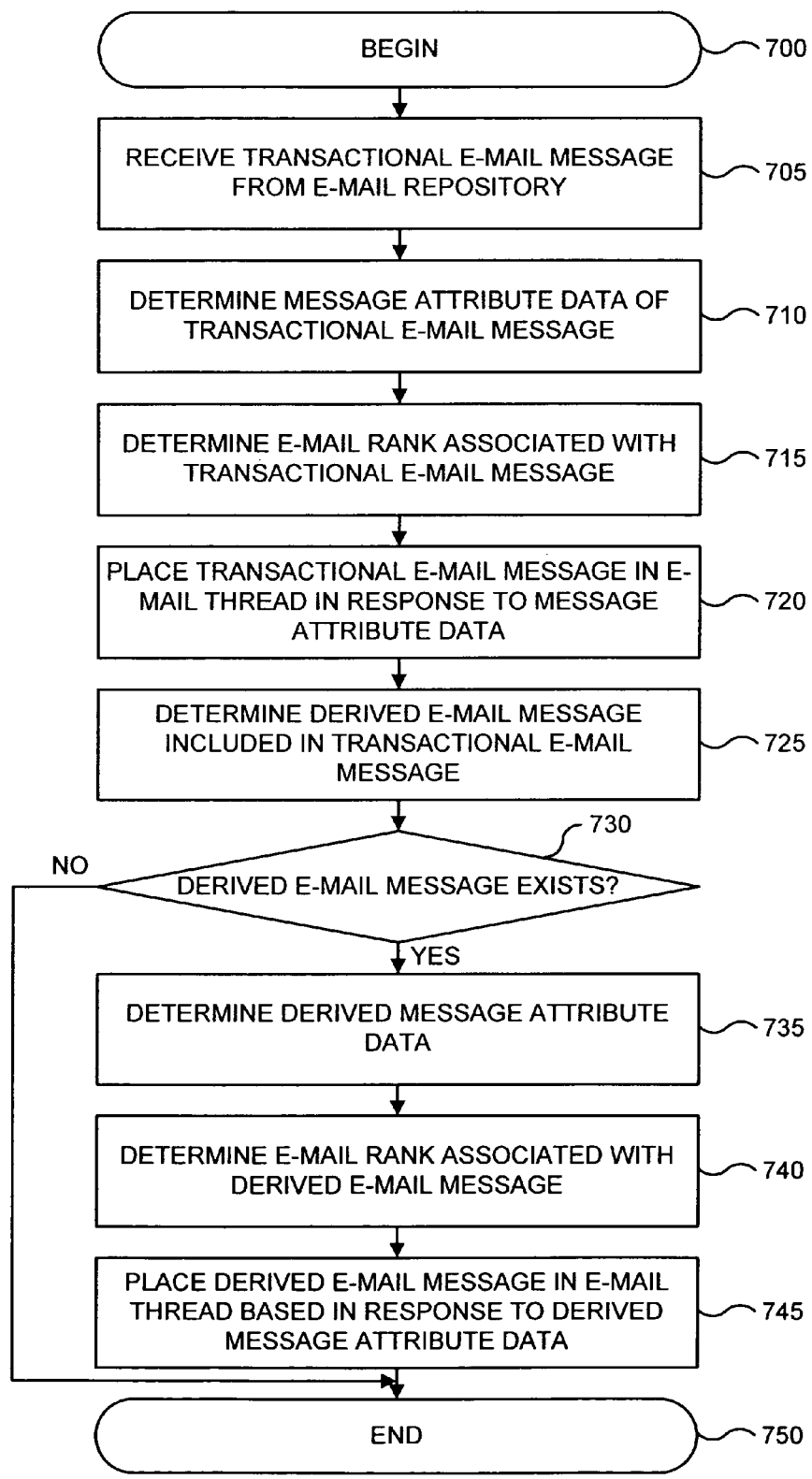
FIG. 7 is a flowchart for processing e-mail messages to determine derived e-mail messages in an exemplary implementation of the invention.

FIG. 7 is a flowchart for processing e-mail messages to determine derived e-mail messages in an exemplary implementation of the invention. FIG. 7 begins in step 700. In step 705, the computer system 300 (FIG. 3) receives a transactional e-mail message from an e-mail repository. A transactional e-mail message is an e-mail message directly retrieved from an e-mail message repository, such as an e-mail server or an e-mail storage file (e.g., a PST file), as opposed to a derived e-mail message which generally is determined from a transactional e-mail message.

In step 710, the computer system 300 determines message attribute data of the transactional e-mail message. Some examples of message attribute data are message content body, quoted text sections, attachments, signature sections, and message header information: such as a sender identifier, one or more recipient identifiers, the number of recipients, routing information, a subject line, a time stamp, and the like. In step 715, the computer system 300 determines an e-mail rank associated with the transactional e-mail message. An e-mail rank is any quantitative value, symbol, or indicator associated with an e-mail message that is used to provide an indication of qualitative value, relevance, standing, degree, or position of the e-mail message.

In this example, the computer system 300 determines a numerical value in response to the message attribute data for the e-mail rank associated with the transactional e-mail message. The computer system 300 may also assign the transactional e-mail message 3 or 4 starts out of 5 stars. Additionally, the computer system 300 may also use external sources of information to determine the e-mail rank of e-mail messages. One exemplary method of determining an e-mail rank associated with e-mail messages is described with respect to FIGS. 8A and 8B.

In step 720, the computer system 300 places the transactional e-mail message in an e-mail thread in response to the message attribute data. In step 725, the computer system 300 determines whether a derived e-mail message is included in the transactional e-mail message. The derived e-mail message may be included in the transactional e-mail message as quoted text and as an attachment.

In step 730, if a derived e-mail message does not exists or is not included in the transactional e-mail message, the flowchart ends in step 750. Alternatively, if a derived e-mail message does exist or is included in the transactional e-mail message, the flowchart continues in step 735.

In step 735, the computer system 300 determines derived message attribute data of the derived e-mail message. Some examples of derived message attributed data are a relationship with the transaction e-mail message (e.g., in-line, attached, forwarded, replied, etc.), derived message content body, quoted text sections, attachments, signature sections, and derived message header information: such as a sender identifier, one or more recipient identifiers, the number of recipients, routing information, a subject line, a time stamp, and the like.

In step 740, the computer system 300 determines an e-mail rank associated with the derived e-mail message. In this example, the computer system 300 determines the e-mail rank of the derived e-mail message in response to the derived message attribute data and the e-mail rank of the transactional e-mail message. In step 745, the computer system 300 places the derived e-mail message in the e-mail thread, along with the transactional e-mail message, in response to the derived e-mail message data. FIG. 7 ends in step 750.

Ranking Electronic Messages

In various embodiments, the computer system 300 processes e-mail messages (e.g., transactional e-mail messages and derived e-mail messages) to determine an e-mail rank associated with the e-mail message. A benefit provided by various embodiments is that the computer system 300 allows users and organizations to sort, analyze, and process captured information in transactional and derived e-mail messages in response to e-mail ranks.

In general, a system (e.g., computer system 300 of FIG. 3) for ranking electronic messages includes a processor. The processor receives an e-mail message and determines a sender identifier associated with the e-mail message. The processor may also determine message attribute data in response to the e-mail message. The processor then determines an e-mail rank associated with the e-mail message in response to the sender identifier. The processor may determine the e-mail rank based on the message attribute data.

Figure 8A:
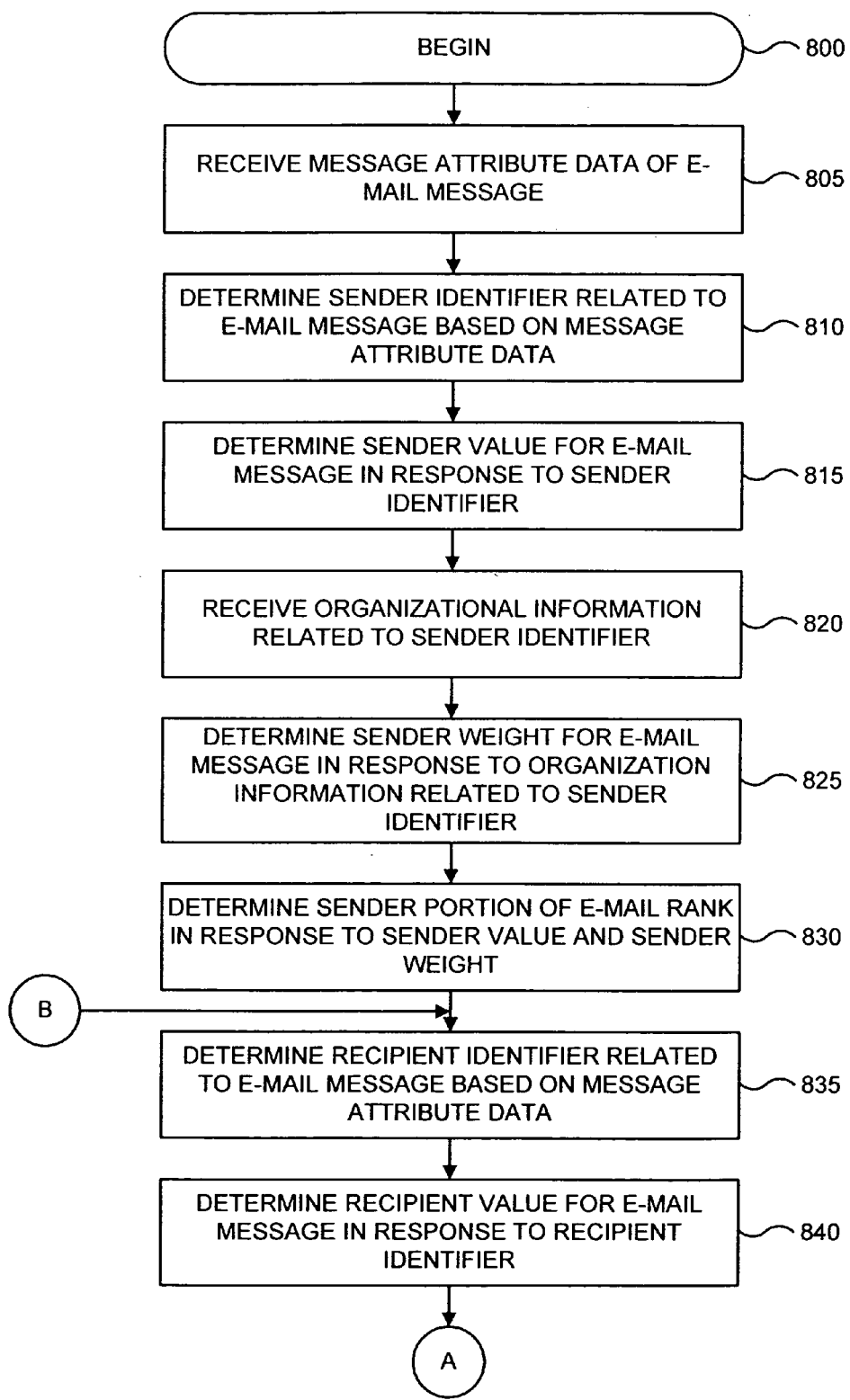
FIG. 8A and FIG. 8B are a flowchart for determining an e-mail rank associated with an e-mail message in an exemplary implementation of the invention.
Figure 8B:
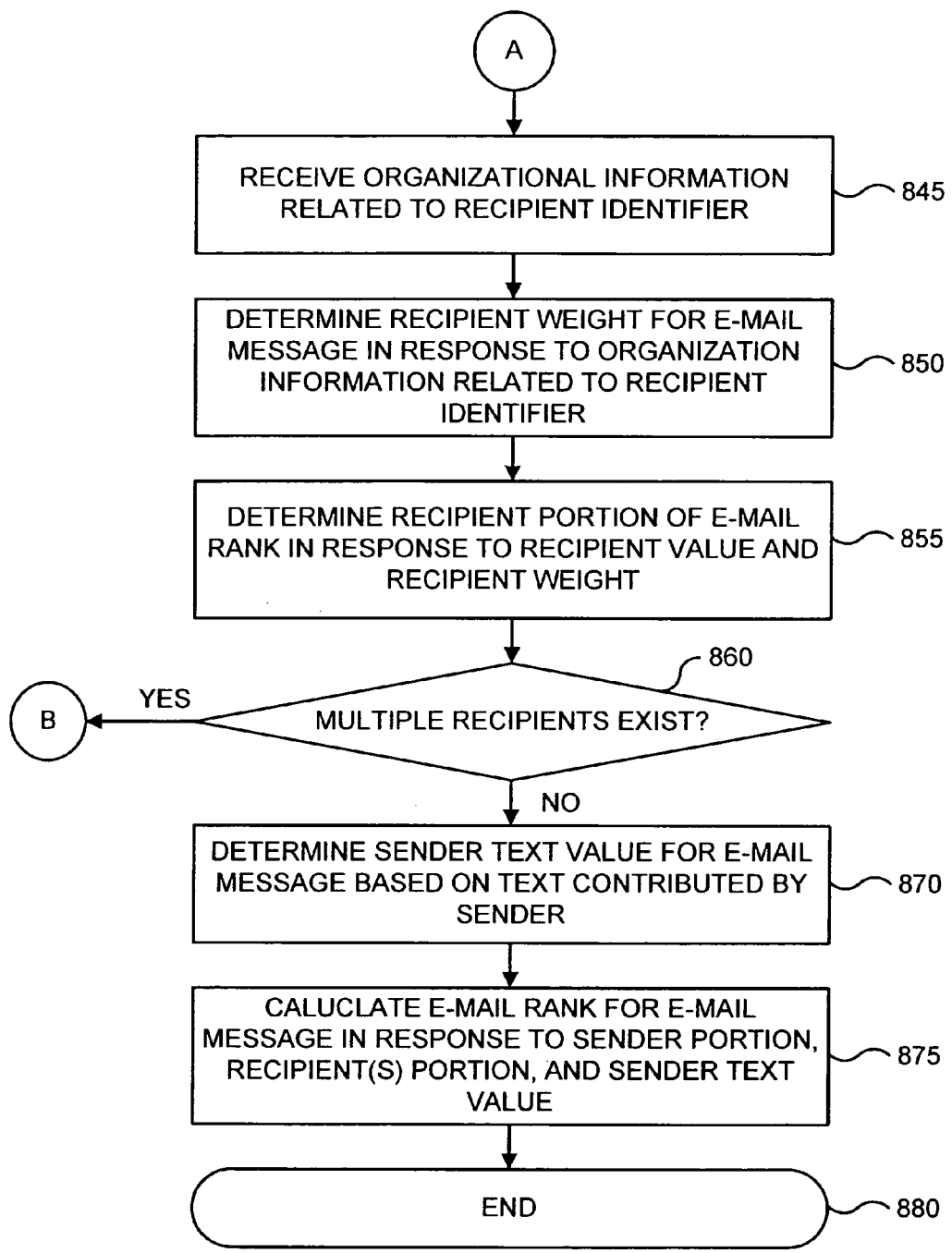

FIG. 8A and FIG. 8B are a flowchart for determining an e-mail rank associated with an e-mail message in an exemplary implementation of the invention. FIG. 8A begins in step 800. In step 805, the computer system 300 receives message attribute data of the e-mail message. In this example, the e-mail message can be a transactional e-mail message or a derived e-mail message.

In step 810, the computer system 300 determines a sender identifier related to the e-mail message based on the message attribute data. Some examples of sender identifiers are Internet e-mail address (such as To, CC, and BCC), usernames, hostnames, last names, and first names. In step 815, the computer system 300 determines a sender value for the e-mail message in response to the sender identifier.

In step 820, the computer system 300 receives organizational data related to the sender identifier. For example, the computer system 300 may determine that the sender identifies is the CEO, CIO, CTO, President, and the like. In various embodiments, the computer system 300 retrieves the organizational data from organizational or corporate directories, corporate organization charts, and the like. In step 825, the computer system 300 determines a sender weight for the e-mail message in response to the organizational data related to the sender identifier. In step 830, the computer system 300 determines a sender portion of the e-mail rank in response to the sender value and the sender weight.

In step 835, the computer system 300 determines a recipient identifier related to the e-mail message based on the message attribute data. In step 840, the computer system 300 determines a recipient value for the e-mail message in response to the recipient identifier.

Referring to FIG. 8B, in step 845, the computer system 300 receives organizational data related to the recipient identifier. In step 850, the computer system 300 determines a recipient weight for the e-mail message in response to the organizational data related to the recipient identifier. In step 855, the computer system 300 determines a recipient portion of the e-mail rank in response to the recipient value and the recipient weight.

In step 860, if multiple recipients of the e-mail exist, the flowchart returns to step 835 to determine another recipient identifier. If no more recipient identifiers exist or recipient processing is otherwise terminated, the flowchart continues in step 870.

In step 870, the computer system 300 determines a sender text value for the e-mail message based on text contributed by the sender. In one example, the entire e-mail message comprises original text contributed by the sender. In another example, the e-mail message comprises answers contributed by the sender and questions included in a previously received e-mail message. If no text is contributed, the computer system 300 may determine the sender text value to be zero (0). For the more original text contributed, the computer system 300 determines a larger sender text value.

In step 875, the computer system 300 calculates the e-mail rank for the e-mail message in response to the sender portion, the recipient portion of one or more recipients, and the sender text value. The computer system 300 maps or otherwise associates the e-mail rank to the e-mail message. FIG. 8B ends in step 880.

In one embodiment, the computer system 300 determines the e-mail message rank as a weighted average of a SenderValue, ToValue, and CCValue. For example, the computer system 300 determines the e-mail rank (e.g., MessageRank) according to the following equation:

$$MessageRank = \frac{(SenderValue * SenderWeight) + (ToValue * ToWeight) + (CCValue * CCWeight)}{SenderWeight + ToWeight + CCWeight}$$

In this example, the computer system 300 derives the SenderValue component using a weighted average of the sender's role (e.g., organizational role or corporate office) and the text contributed by the sender. The computer system 300 determines the value of the text contributed by the sender based on word frequency. Another example of determining e-mail rank is described in U.S. Provisional Application No. 60/761,500, filed Jan. 23, 2006 and entitled "E-Mail Threading, Ranking, Derivation and Topic Classification Methods and Apparatus."

Electronic Message Threading

In various embodiments, the computer system 300 processes e-mail messages (e.g., transactional e-mail messages and derived e-mail messages) to determine "discussions" or "communications." These discussions or communications may be found in a series or sequence of e-mail messages. A benefit provided by various embodiments is that the computer system 300 allows users and organizations to sort, analyze, and process captured information in transactional and derived e-mail messages into logical discussions or communications.

In general, a system (e.g., computer system 300 of FIG. 3) for threading of electronic messages includes a processor. The processor receives an e-mail message and determines message attribute data in response to the e-mail message. The processor then determines the position of the e-mail in an e-mail thread in response to the message attribute data.

Figure 9:
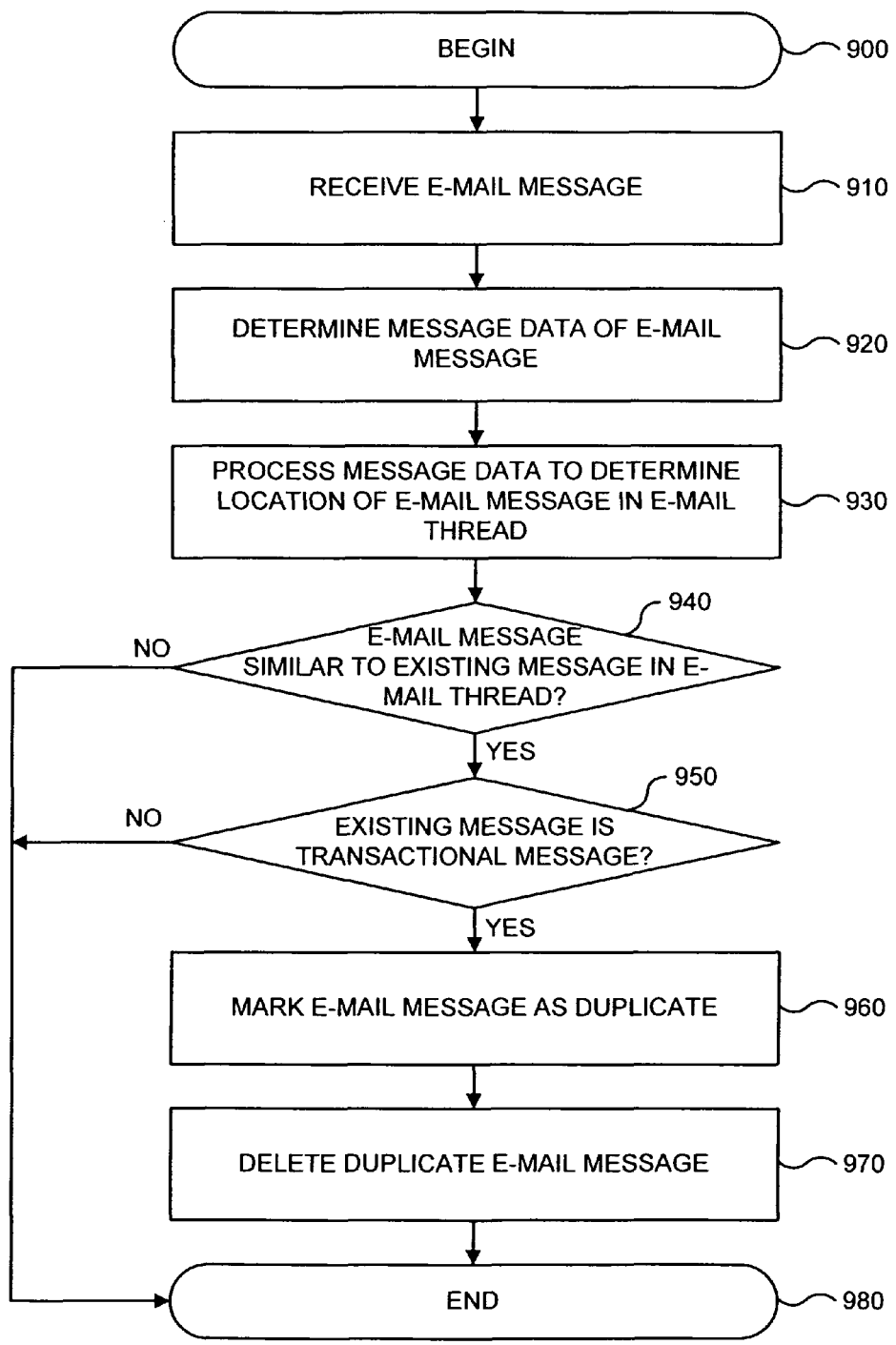
FIG. 9 is a flowchart for processing e-mail messages for placement in an e-mail thread in an exemplary implementation of the invention.

FIG. 9 is a flowchart for processing e-mail messages for placement in an e-mail thread in an exemplary implementation of the invention. FIG. 9 begins in step 900. In step 910, the computer system 300 receives an e-mail message. In step 920, the computer system 300 determines message attribute data of the e-mail message. In step 930, the computer system 300 processes the message attribute data to determine a location of the e-mail message in an e-mail thread.

In step 940, the computer system 300 determines whether the e-mail message is similar to an existing e-mail message in the e-mail thread. If the e-mail message is not similar to an existing e-mail message in the e-mail thread, FIG. 9 ends in step 980. Alternatively, if the e-mail message is similar to an existing e-mail message in the e-mail thread, the computers system 300 determines whether the existing e-mail message is a transactional e-mail message in step 950. In this example, the computer system 300 provides deference to transactional e-mail messages, as opposed to derived e-mail message whose message text may have been altered during a reply or forward operation.

In step 960, the computer system 300 marks the e-mail message as a duplicate. In step 970, the computer system 300 deletes the duplicate e-mail message. FIG. 9 ends in step 980.

Figure 10A:
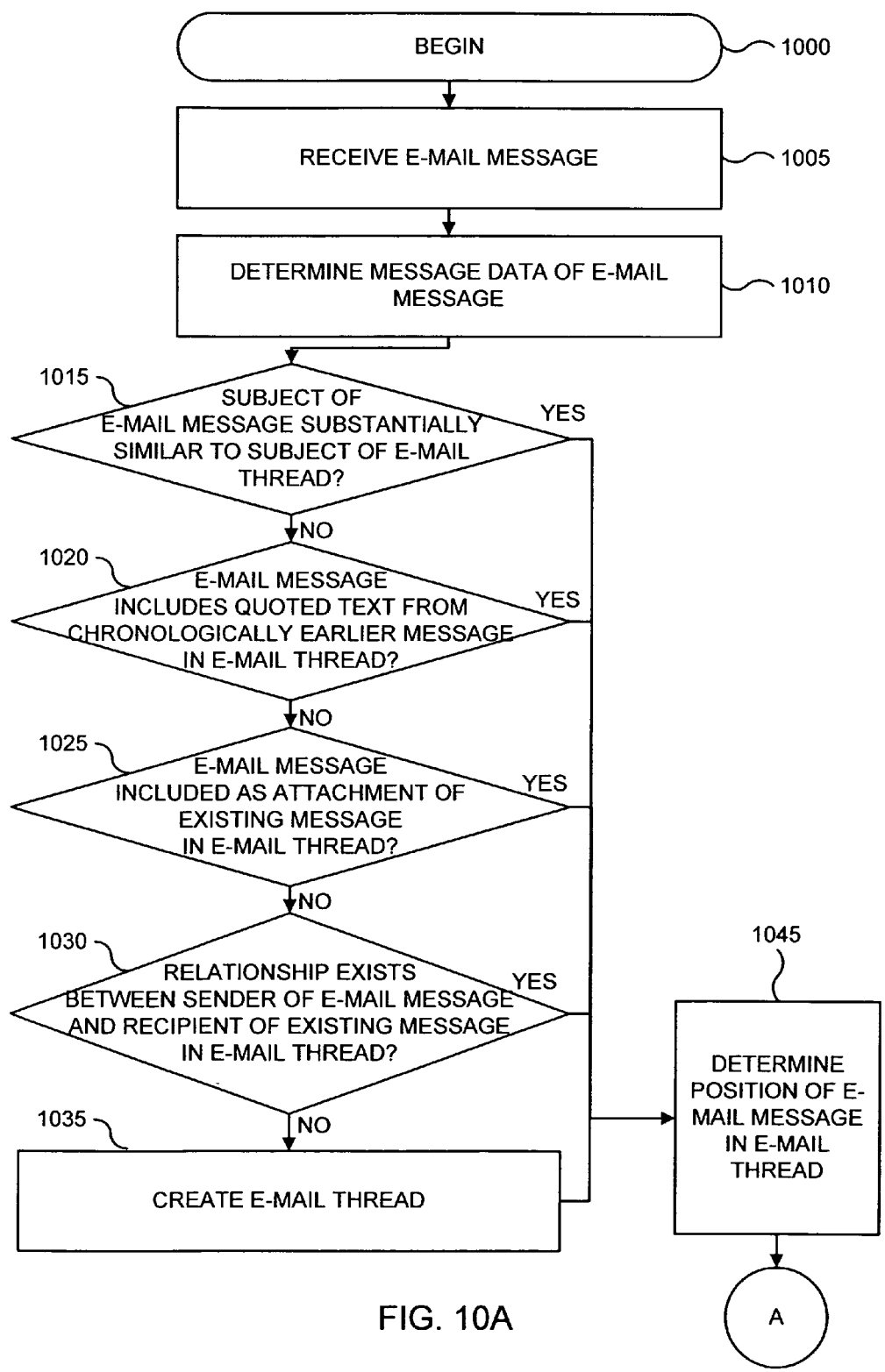
FIG. 10A and FIG. 10B are a flowchart for organizing an e-mail message in an e-mail thread in an exemplary implementation of the invention.
Figure 10B:
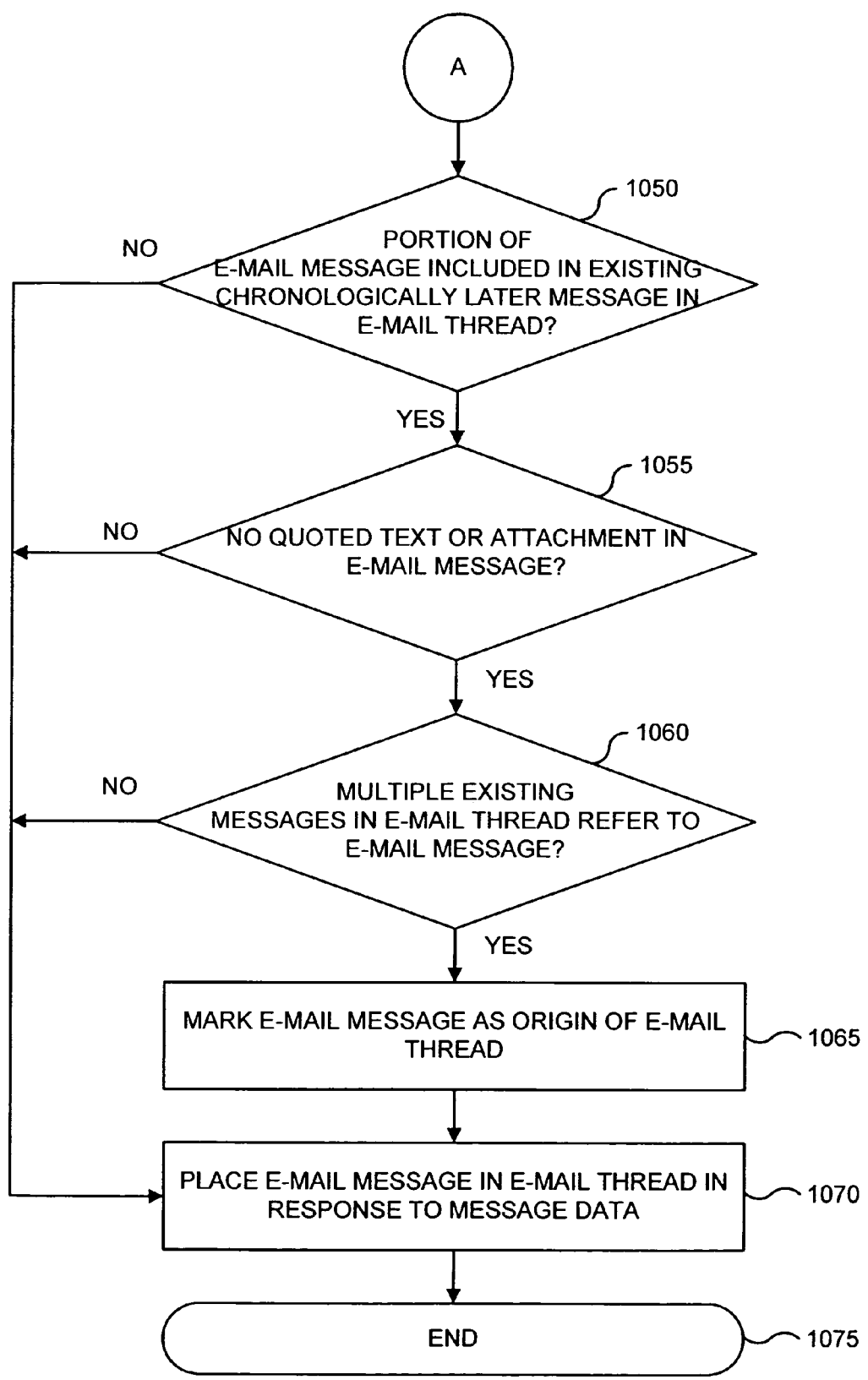

FIG. 10A and FIG. 10B are a flowchart for organizing an e-mail message, such as the e-mail message 640 from user C of FIG. 6, in an e-mail thread in an exemplary implementation of the invention. FIG. 10A begins in step 1000. In step 1005, the computer system 300 receives the e-mail message 640 (e.g., from one of the mail servers 117 of FIG. 1). In step 1010, the computer system 300 determines message attribute data of the e-mail message 640, such as sender identifier, recipient identifies, subject, timestamps, and the like.

In step 1015, the computer system 300 determines whether the subject of the e-mail message 640 (e.g., from the message attribute data) is substantially similar to the subject of an e-mail thread. If the subjects are not similar, in step 1020, the computer system 300 determines whether the e-mail message 640 includes quoted text from a chronologically earlier e-mail message in the e-mail thread (e.g., text from e-mail messages 615). If the e-mail message 640 does not include quoted text, the computer system 300 determines whether the e-mail message 640 is included as an attachment of an existing e-mail message in the e-mail thread (e.g., in e-mail messages 670, 675, or 680) in step 1025.

If the e-mail message 640 is not included as an attachment, in step 1030, the computer system 300 determines whether a relationship exists between a sender of the e-mail message 640 and a recipient of an existing e-mail message in the e-mail thread (e.g., with the e-mail message 615, 670, 675, and 680). If the computer system 300 makes a negative determination in each of the steps 1015, 1020, 1025, and 1030, the computer system 300 creates a new e-mail thread with the subject of the e-mail message 640 in step 1035. If the computer system 300 makes a positive determination in any of the steps 1015, 1020, 1025, and 1030, the computer system 300 proceeds to determine the position of the e-mail message 640 within the corresponding e-mail thread in step 1045.

Referring to FIG. 10B, in step 1050, the computer system 300 determines whether a portion of the e-mail message 640 is included in a chronologically later e-mail message in the e-mail thread, for example in the e-mail messages 670, 675, or 680. If a positive determination is made, the computer system 300 determines whether there is no quoted text or attachments (such as would indicate an earlier derived e-mail message) in the e-mail message 640 in step 1055. If another positive determination is made, the computer system 300 determines whether multiple existing e-mail message in the e-mail thread refer to the e-mail message 640 in step 1060.

If the computer system 300 makes a positive determination in the steps 1050, 1055, and 1060, the computer system 300 marks the e-mail message 640 as an origin of the e-mail thread. In general, the origin of an e-mail thread is an e-mail message that initiated the sending of subsequent e-mail messages forming a logical discussion or conversation. Typically, the subsequent e-mail messages have similar subjects as the origin e-mail address or refer to the origin e-mail message. The subsequent e-mail messages may also include all or a portion of the original e-mail address as quoted text or as an attachment.

In step 1070, the computer system 300 places the e-mail message 640 in the e-mail thread in response to the message data. If the computer system makes a negative determination in the steps 1050, 1055, and 1060, the computer system 300 places the e-mail message 640 in the e-mail thread in response to the message attribute data. If the computer system makes a positive determination in the steps 1050, 1055, and 1060, the computer system 300 places the e-mail message as the origin of the e-mail thread.

In this example, the computer system 300 places the e-mail message 640 chronologically before the e-mail messages 670, 675, and 680. The computer system 300 identifies the relationships between the e-mail messages 640, 670, 675, and 680, such as between sender and recipient, quoted text, attachments, and the like. The computer system 300 places the e-mail message 640 chronologically after the e-mail message 615. The computer system 300 identifies the relationships between the e-mail messages 615 and 640.

In various embodiments, as the computer system 300 incrementally receives e-mail messages, the e-mail message may not be received in chronological order, or any order for that matter. In response, the computer system 300 may continuously "promote" or "demote" processed e-mail messages as the origin of an e-mail thread. The computer system 300 may continuously organize the e-mail thread in response to processed e-mail messages, altering relationships and updating the positions of e-mail messages in the thread in response to message attribute data of the e-mail messages. FIG. 10B ends in step 1075.

Ordering of Electronic Message Threads

In various embodiments, the computer system 300 processes e-mail threads (e.g., transactional e-mail messages and derived e-mail messages) to determine an ordering associated with the e-mail threads. A benefit provided by various embodiments is that the computer system 300 allows users and organizations to sort, analyze, and process captured information in transactional and derived e-mail messages into e-mail threads that may be ordered based on different criteria, such as time, topic, rank, and relevance.

In general, a system (e.g., computer system 300 of FIG. 3) for ranking electronic messages includes a processor. The processor receives a plurality of e-mail messages and determines a plurality of e-mail threads in response to the plurality of e-mail messages. The processor determines an e-mail rank associated with each e-mail message in the plurality of e-mail threads. The processor determines an e-mail rank associated with an e-mail message in response to a sender identifies related to the e-mail message.

The processor determines a thread rank for each e-mail thread in the plurality of e-mail threads. The processor determines a thread rank associated with an e-mail thread in response to e-mail ranks of each e-mail message associated with each respective e-mail thread. The processor then determines an ordering of the plurality of e-mail threads in response to the thread rank associated with each e-mail thread in the plurality of e-mail threads.

Figure 11:
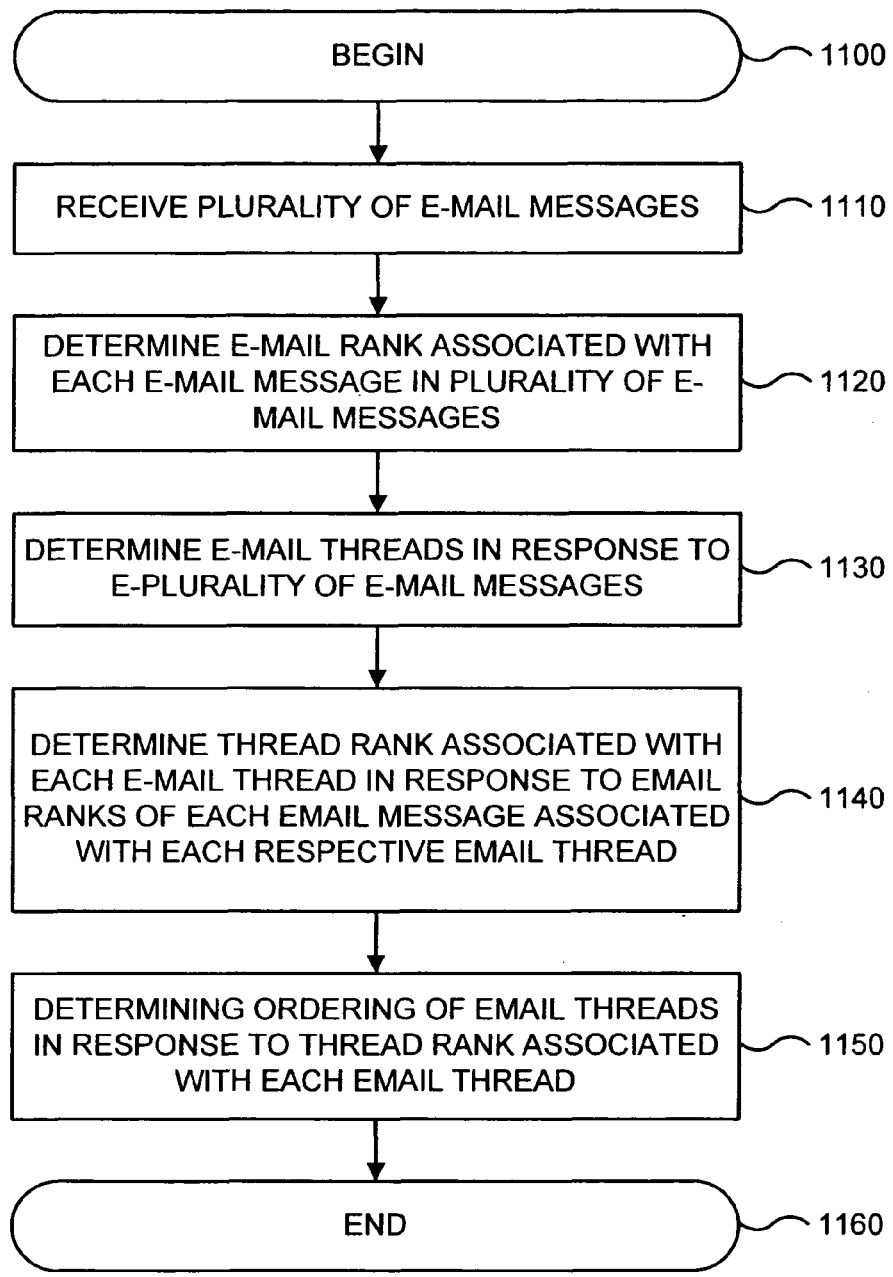
FIG. 11 is a flowchart for ordering e-mail threads in an exemplary implementation of the invention.

FIG. 11 is a flowchart for ordering e-mail threads in an exemplary implementation of the invention. FIG. 11 beings in step 1100. In step 1110, the computer system 300 receives a plurality of e-mail messages. In step 1120, the computer system 300 determines the e-mail rank associated with each e-mail message in the plurality of e-mail messages.

In step 1130, the computer system 300 determines e-mail threads in response to the plurality of e-mail messages. In step 1140, the computer system 300 determines a thread rank associated with each e-mail thread in response to e-mail ranks of each e-mail message associated with each respective e-mail thread. In some example, the thread rank is a weighted average of the e-mail ranks associated with the e-mail message in an e-mail thread.

In step 1150, the computer system 300 determines an ordering of the e-mail threads in response to the thread ranks of each e-mail thread. The computer system 300 then may display the ordering to a user or generate a report containing the ordering. The ordering of e-mail threads allows a user or organization to determine which communications or conversations embodied in e-mail threads are most active or most relevant to a topic or other search criteria. FIG. 11 ends in step 1160.

Advantageously, the computer system 300 can display the ordering of the e-mail thread to a user. For example, the computer system 300 can provide the user with a ordering of e-mail threads based on a search performed for discussions or communications related to organization trade secrets. In another example, the computer system 300 displays an ordering of the most active or highly discussed topics or categories in an organization.

Figure 12:
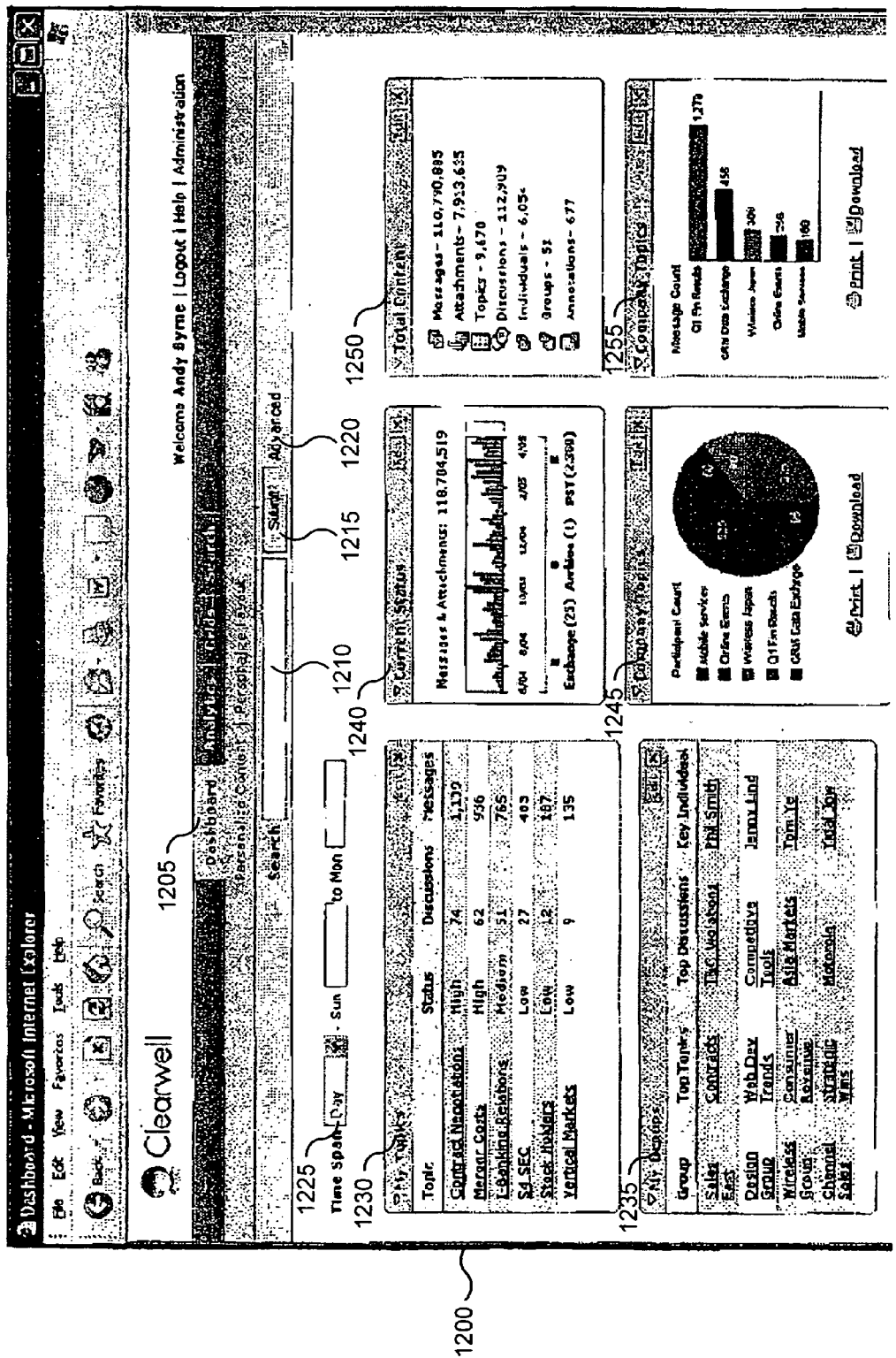
FIG. 12 is a screenshot of an exemplary dashboard displaying information related to processing of e-mail messages in an exemplary implementation of the invention.

FIG. 12 is a screenshot 1200 of an exemplary dashboard 1205 displaying information related to processing of e-mail messages in an exemplary implementation of the invention. The dashboard 1205 includes a search box 1210, a search submit button 1215, an advanced search button 1220, a time span interface 1225, a personalized topic display portion 1230, a group display portion 1235, a current status display portion 1240, a participants/topic display portion 1245, a total content display portion 1250, and a message/topic display portion 1255.

In this example, the search box 1210 allows a user enter search criteria and click the search submit button 1215 to search information processed by the system 100 (FIG. 1). The user may click the advanced search button 1220 to enter a dialog (not show) provided additional search function features. The retrieved search results may be displayed in the dashboard 1205 or in a new display window. Additionally, the time span interface 1225 allows the user to enter day and time information to restrict the information displayed by the dashboard 1205.

The personalized topic display portion 1230 depicts topics of interest to the user. The topic may be arranged in the personalized topic display portion 1230 according to topic alphabetical order, topic status, the number of discussions related to a particular topic, and the number of messages related to a particular topic, as illustrated. The group display portion 1235 depicts groups in an organization and the top or most active topics, discussions, and key individuals associated with a topic, as illustrated.

The current status display portion 1240 depicts the current status of the system 100, such as the number of e-mail messages and attachments in the master index 105, and the number of messages retrieved from an e-mail server, an archive, and a PST file, as illustrated. The participants/topic display portion 1245 depicts the number of participants for a particular topic. For example, the top five topics and the number of participants associated with each of the top five topics may be displayed by a pie chart. Each topic may be displayed using a different color, as illustrated.

The total content display portion 1250 depicts the number of e-mail messages, the number of attachments, the number of topics, the number of discussions, the number of individuals, the number of groups, and the number of annotations in the master index 105, as illustrated. A unique or descriptive icon may represent each portion of the content in the master index. The message/topic display portion depicts the message count associated with a particular topic. In this example, the screenshot 1200 depicts a bar chart for the message count of five topics. In some embodiments, the dashboard 1205 includes links for printing or downloading information presented on the dashboard.

Figure 13:
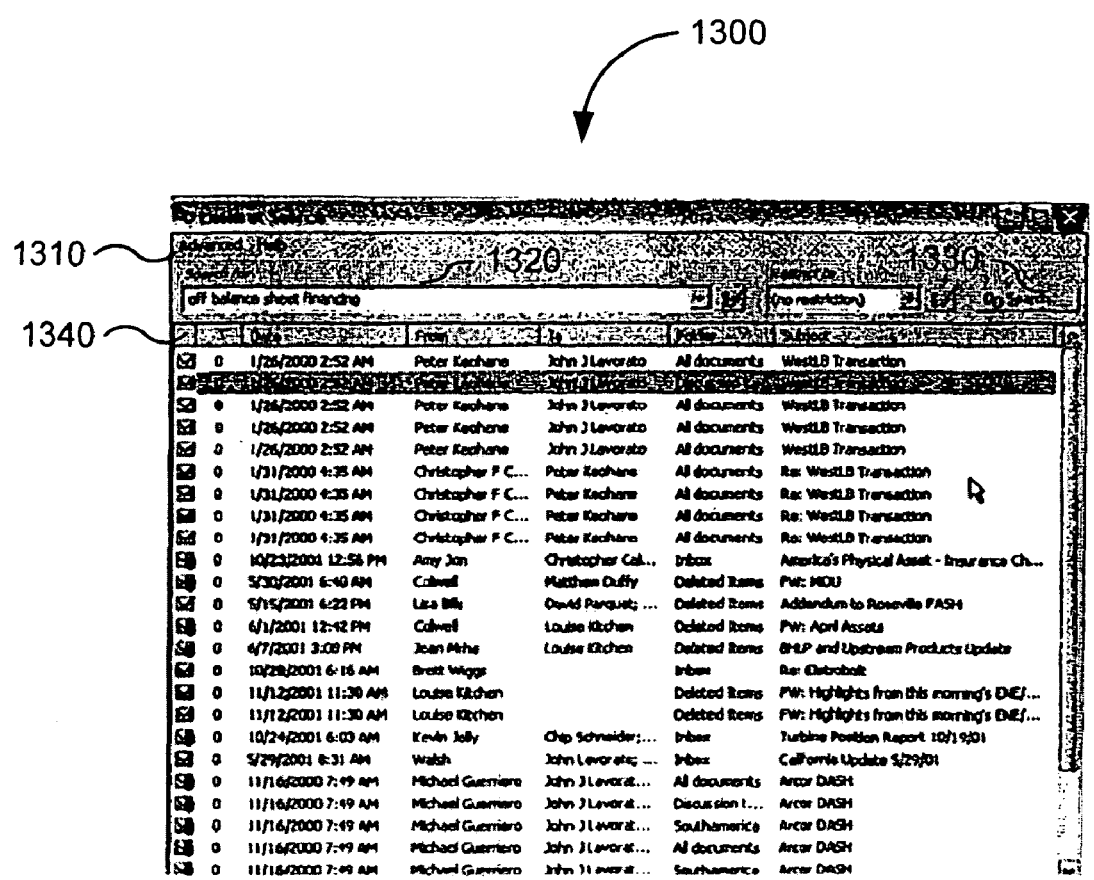
FIG. 13 is a screenshot of an exemplary search dialog displaying information related to e-mail messages in an exemplary implementation of the invention.

FIG. 13 is a screenshot 1300 of an exemplary search dialog 1310 displaying information related to e-mail messages in an exemplary implementation of the invention. The e-mail message search dialog 1310 includes a search box 1320, a search button 1330, and a search listing 1340. The search box 1320 allows a user to enter search terms to search information processed by the system 100. The search button 1330 submits the search terms to the e-mail processing system (e.g., the analytics ETL 116).

The search listing 1340 displays the information retrieved from the master index 105, as illustrated. In this example, the search listing 1340 displays whether an e-mail message includes an attachment, a time stamp, a sender identifier ("From"), a recipient identifier ("To"), a location or folder identifier, an a subject. In some embodiments, the search listing 1340 displays the e-mail messages sorted by a subject, a sender identifier, and/or an e-mail rank, as illustrated, as well as by other information desired by the user.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for organizing a plurality of e-mail messages for electronic discovery investigators, the method comprising:

receiving, at one or more computer systems, a plurality of processed e-mail messages, the plurality of processed e-mail messages including a plurality of transactional e-mail messages and a plurality of derived e-mail messages derived from the plurality of e-mail messages in response to extracting information from message attribute data of one or more of the plurality of transactional e-mail messages to create the plurality of derived e-mail messages;

determining, with one or more processors associated with the one or more computer systems, an e-mail rank for each e-mail message in the plurality of processed e-mail messages as a weighted average of a sender value determined for a sender identifier related to the e-mail message and a recipient value determined for each of one or more recipient identifiers related to the e-mail message, the sender value further quantifying text contributed to the e-mail message by the sender of the e-mail message;

determining, with the one or more processors associated with the one or more computer systems, a plurality of e-mail threads associated with the plurality of processed e-mail messages, each of the plurality of e-mail threads including one or more of the plurality of processed e-mail messages;

determining, with the one or more processors associated with the one or more computer systems, a thread rank for each e-mail thread in the plurality of e-mail threads based on a weighted average of one or more e-mail ranks associated with the one or more of the plurality of processed e-mail messages associated with the e-mail thread;

organizing, with the one or more processors associated with the one or more computer systems, the plurality of processed e-mail messages based on the thread rank of each e-mail thread in the plurality of e-mail threads;

generating, with the one or more processors associated with the one or more computer systems, information configured to display to electronic discovery investigators on a graphical user interface the organized plurality of processed e-mail messages; and wherein determining the plurality of e-mail threads further comprises:

determining, with the one or more processors associated with the one or more computer systems, whether an e-mail message to be placed in an e-mail thread is a duplicate of an e-mail message in the e-mail thread; and associating, with the one or more processors associated with the one or more computer systems, the e-mail message to be placed in the e-mail thread with the e-mail thread when the e-mail message to be placed in the e-mail thread is determined not to be a duplicate of any e-mail message in the e-mail thread.

2. The method of claim 1 further comprising displaying the information configured to display the organized plurality of processed e-mail messages on a display device.

3. The method of claim 2 further comprising displaying the information configured to display the organized plurality of processed e-mail messages on the display device in accordance with the thread rank of each e-mail thread in the plurality of e-mail threads.

4. The method of claim 1 further comprising:

receiving, at the one or more computer systems, organizational information associated with the sender identifier; and determining, with the one or more processors associated with the one or more computer systems, the sender value for the sender identifier based on the organizational information.

5. The method of claim 4 wherein the organizational information includes information selected from a group consisting of: a department associated with the sender identifier, group information associated with the sender identifier, a title associated with the sender identifier, and security information associated with the sender identifier.

6. The method of claim 1 further comprising:
receiving, at the one or more computer systems, organizational information associated with the one or more recipient identifiers; and
determining, with the one or more processors associated with the one or more computer systems, the recipient value for the one or more recipient identifiers based on the organizational information.

7. The method of claim 6 wherein the organizational information includes information selected from a group consisting of: a department associated with one or more of the one or more recipient identifiers, group information associated with the one or more of the one or more recipient identifiers, a title associated with the one or more of the one or more recipient identifiers, and security information associated with one or more of the one or more recipient identifiers.

8. The method of claim 1 wherein the one or more message attributes includes information relating to at least one of a time sent, a subject, a message body, and a signature.

9. A system for organizing a plurality of e-mail messages, the system comprising:
a processor; and
a memory in communication with the processor and configured to store a set of instructions which when executed by the processor configure the processor to:
receive a plurality of processed e-mail messages, the plurality of processed e-mail messages including a plurality of transactional e-mail messages and a plurality of derived e-mail messages derived from the plurality of e-mail messages in response to extracting information from message attribute data of one or more of the plurality of transactional e-mail messages to create the plurality of derived e-mail messages;
determine an e-mail rank for each e-mail message in the plurality of processed e-mail messages as a weighted average of a sender value determined for a sender identifier related to the e-mail message and a recipient value determined for each of one or more recipient identifiers related to the e-mail message, the sender value further quantifying text contributed to the e-mail message by the sender of the e-mail message;
determine a plurality of e-mail threads associated with the plurality of processed e-mail messages, each of the plurality of e-mail threads including one or more of the plurality of processed e-mail messages;
determine a thread rank for each e-mail thread in the plurality of e-mail threads based on a weighted average of one or more e-mail ranks associated with the one or more of the plurality of processed e-mail messages in the e-mail thread;
organize the plurality of processed e-mail messages based on the thread rank of each e-mail thread in the plurality of e-mail threads;
generating information configured to display on a graphical user interface to electronic discovery investigators the organized plurality of processed e-mail messages; and
wherein in determining the plurality of e-mail threads, the processor is further configured to:
determine whether an e-mail message to be placed in an e-mail thread is a duplicate of an e-mail message in the e-mail thread; and
associate the e-mail message to be placed in the e-mail thread with the e-mail thread only if the e-mail message to be placed in the e-mail thread is determined not to be a duplicate of any e-mail message in the e-mail thread.

10. The system of claim 9 further comprising a display device configured to display the information configured to display the organized plurality of processed e-mail messages in accordance with the thread rank of each e-mail thread in the plurality of e-mail threads.

11. The system of claim 9 wherein the processor is further configured to:
receive organizational information associated with the sender identifier; and
determine the sender value for the sender identifier based on the organizational information.

12. The system of claim 11 wherein the organizational information includes information selected from a group consisting of: a department associated with the sender identifier, group information associated with the sender identifier, a title associated with the sender identifier, and security information associated with the sender identifier.

13. The system of claim 9 wherein the processor is further configured to:
receive organizational information associated with the one or more recipient identifiers; and
determine the recipient value for the one or more recipient identifiers based on the organizational information.

14. The system of claim 13 wherein the organizational information includes information selected from a group consisting of: a department associated with one or more of the one or more recipient identifiers, group information associated with the one or more of the one or more recipient identifiers, a title associated with the one or more of the one or more recipient identifiers, and security information associated with one or more of the one or more recipient identifiers.

15. The system of claim 9 wherein the one or more message attributes includes information relating to at least one of a time sent, a subject, a message body, and a signature.

16. A non-transitory computer-readable medium storing computer-executable code for organizing a plurality of e-mail messages, the non-transitory computer-readable medium comprising:
code for receiving a plurality of processed e-mail messages, the plurality of processed e-mail messages including a plurality of transactional e-mail messages and a plurality of derived e-mail messages derived from the plurality of e-mail messages in response to extracting information from message attribute data of one or more of the plurality of transactional e-mail messages to create the plurality of derived e-mail messages;
code for determining an e-mail rank for each e-mail message in the plurality of processed e-mail messages as a weighted average of a sender value for a sender identifier related to the e-mail message and a recipient value for each of one or more recipient identifiers related to the e-mail message, the sender value further quantifying text contributed to the e-mail message by the sender of the e-mail message;
code for determining a plurality of e-mail threads associated with the plurality of processed e-mail messages, each of the plurality of e-mail threads including one or more of the plurality of processed e-mail messages;
code for determining a thread rank for each e-mail thread in the plurality of e-mail threads based on a weighted average of one or more e-mail ranks associated with the one or more of the plurality of processed e-mail messages associated with the e-mail thread;

code for organizing the plurality of processed e-mail messages based on the thread rank of each e-mail thread in the plurality of e-mail threads; code for generating information configured to display on a graphical user interface to electronic discovery investigators the organized plurality of processed e-mail messages; and wherein the code for determining the plurality of e-mail threads comprises:

code for determining whether an e-mail message to be placed in an e-mail thread is a duplicate of an e-mail message in the e-mail thread; and code for associating the e-mail message to be placed in the e-mail thread with the e-mail thread only if the e-mail message to be placed in the e-mail thread is determined not to be a duplicate of any e-mail message in the e-mail thread.

17. The non-transitory computer-readable medium of claim 16 further comprising code for displaying the information configured to display the organized plurality of processed e-mail messages in accordance with the thread rank of each e-mail thread in the plurality of e-mail threads.

18. The non-transitory computer-readable medium of claim 16 further comprising:

code for receiving organizational information associated with the sender identifier; and code for determining the sender value for the sender identifier based on the organizational information.

19. The non-transitory computer-readable medium of claim 18 wherein the organizational information includes information selected from a group consisting of: a department associated with the sender identifier, group information associated with the sender identifier, a title associated with the sender identifier, and security information associated with the sender identifier.

20. The non-transitory computer-readable medium of claim 16 further comprising:

code for receiving organizational information associated with the one or more recipient identifiers; and code for determining the recipient value for the one or more recipient identifiers based on the organizational information.

21. The non-transitory computer-readable medium of claim 20 wherein the organizational information includes information selected from a group consisting of: a department associated with one or more of the one or more recipient identifiers, group information associated with the one or more of the one or more recipient identifiers, a title associated with the one or more of the one or more recipient identifiers, and security information associated with one or more of the one or more recipient identifiers.

22. The non-transitory computer-readable medium of claim 16 wherein the one or more message attributes includes information relating to at least one of a time sent, a subject, a message body, and a signature.

* * * * *